(12) United States Patent
Hagiwara et al.

(10) Patent No.: US 7,257,522 B2
(45) Date of Patent: Aug. 14, 2007

(54) SIMULATOR FOR AUTOMATIC VEHICLE TRANSMISSION CONTROLLERS

(75) Inventors: Kenji Hagiwara, Wako (JP); Youhei Takeda, Wako (JP); Shoichi Suzuki, Wako (JP); Tsutomu Kamiyamaguchi, Wako (JP); Satoshi Terayama, Wako (JP); Ko Yoda, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 929 days.

(21) Appl. No.: 09/925,743

(22) Filed: Aug. 10, 2001

(65) Prior Publication Data

US 2002/0029136 A1    Mar. 7, 2002

(30) Foreign Application Priority Data

Aug. 11, 2000   (JP)   ............................. 2000-244412
Aug. 11, 2000   (JP)   ............................. 2000-244413

(51) Int. Cl.
*G06G 7/48*    (2006.01)
*B60W 10/04*   (2006.01)
*G05B 13/02*   (2006.01)
*G06F 17/00*   (2006.01)
*G06F 15/80*   (2006.01)
*G01L 25/00*   (2006.01)

(52) U.S. Cl. ............................. 703/8; 477/110; 700/28; 700/33; 700/31; 701/59; 701/51; 702/114; 702/183; 702/184; 703/8

(58) Field of Classification Search .................... 703/8; 700/28–33; 702/114, 183–184; 701/59, 701/51; 73/117.2, 117; 477/110
See application file for complete search history.

(56) References Cited

U.S. PATENT DOCUMENTS 4,468,958 A * 9/1984 Takeshita .................... 73/118.1

(Continued)

FOREIGN PATENT DOCUMENTS

EP    0 445 713 A2    3/1991

(Continued)

OTHER PUBLICATIONS

"Object-Oriented Modeling for Gasoline Engine and Automatic Transmission Systems"; Keum-Shik Hong et al; John Wiley & Sons, Inc,; 1999/ 7$^{th}$ Proceedings of Control & Automation (MED99) Haifa, Israel—Jun. 28-30, 1999; CCC 1061-3773/99/020107-13.*

(Continued)

*Primary Examiner*—Kamini Shah
*Assistant Examiner*—Akash Saxena
(74) *Attorney, Agent, or Firm*—Arent Fox LLP

(57) ABSTRACT

A simulator comprising computer-aided design programs for simulating a shift control algorithm stored in an ECU of an automatic transmission having hydraulic clutches. In the simulator, a simplified hydraulic model describes the entire system so as to design a third model based on which simulation is conducted. With this, by using such a simplified model, it becomes possible to decrease simulation time to 4 sec., enabling to simulation in a time close to an actual shift of approximately 1.5 sec. Moreover, the durability of transmission is tested by repeating the simulation. When the occurrence of undesirable shift phenomenon is forecast in the simulation, the shift control algorithm is corrected until the phenomenon disappears in the next simulation. With this, the manufacturing of a test transmission and a preliminary test are no longer needed, thereby further improving the efficiency and costs of transmission development.

34 Claims, 35 Drawing Sheets

U.S. PATENT DOCUMENTS

| | | | |
|---|---|---|---|
| 4,562,729 A | | 1/1986 | Maloney |
| 4,680,959 A | * | 7/1987 | Henry et al. .................. 73/117 |
| 4,680,988 A | * | 7/1987 | Mori ............................ 477/65 |
| 4,799,158 A | * | 1/1989 | Patil ............................ 701/59 |
| 4,821,190 A | * | 4/1989 | Patil ............................ 701/68 |
| 4,829,434 A | * | 5/1989 | Karmel et al. ................. 701/59 |
| 4,836,057 A | * | 6/1989 | Asayama et al. ........... 477/120 |
| 4,855,914 A | * | 8/1989 | Davis et al. .................. 701/60 |
| 4,875,391 A | * | 10/1989 | Leising et al. .............. 477/155 |
| 5,099,428 A | * | 3/1992 | Takahashi ..................... 701/59 |
| 5,179,527 A | * | 1/1993 | Lawrenz ........................ 703/6 |
| 5,241,477 A | * | 8/1993 | Narita .......................... 701/59 |
| 5,249,458 A | | 10/1993 | Sano et al. |
| 5,407,401 A | * | 4/1995 | Bullmer et al. ............. 477/110 |
| 5,428,531 A | * | 6/1995 | Hayafune ..................... 701/65 |
| 5,527,238 A | * | 6/1996 | Hrovat et al. ............... 477/166 |
| 5,713,332 A | * | 2/1998 | Adler et al. ................... 701/59 |
| 5,758,302 A | | 5/1998 | Schulz et al. |
| 5,822,708 A | | 10/1998 | Wagner et al. |
| 5,885,188 A | * | 3/1999 | Iizuka ......................... 477/121 |
| RE36,186 E | * | 4/1999 | White et al. ................ 477/108 |
| 5,895,435 A | * | 4/1999 | Ohta et al. .................... 701/59 |
| 5,921,885 A | * | 7/1999 | Tabata et al. ............... 477/107 |
| 5,951,615 A | * | 9/1999 | Malson ........................ 701/57 |
| 6,077,302 A | * | 6/2000 | Kumra et al. .................. 703/7 |
| 6,080,084 A | * | 6/2000 | Yasue et al. ................. 477/154 |
| 6,086,506 A | | 7/2000 | Petersmann et al. |
| 6,275,761 B1 | * | 8/2001 | Ting ............................ 701/59 |
| 6,285,972 B1 | * | 9/2001 | Barber .......................... 703/8 |
| 6,304,835 B1 | * | 10/2001 | Hiramatsu et al. .............. 703/7 |
| 6,434,466 B1 | * | 8/2002 | Robichaux et al. ........... 701/54 |
| 6,466,883 B1 | * | 10/2002 | Shim ............................ 702/94 |
| 6,491,605 B2 | * | 12/2002 | Saito et al. ................. 477/154 |
| 6,577,940 B2 | * | 6/2003 | Saito et al. .................... 701/59 |
| 6,684,182 B1 | * | 1/2004 | Gold et al. ..................... 703/8 |
| 6,714,850 B2 | * | 3/2004 | Jeon ............................ 701/59 |
| 6,754,603 B2 | * | 6/2004 | Turbett et al. .............. 702/113 |
| 6,772,104 B1 | * | 8/2004 | White et al. ................... 703/8 |
| 6,790,160 B2 | * | 9/2004 | Kato et al. .................. 477/154 |
| 7,013,250 B2 | * | 3/2006 | Hagiwara et al. .............. 703/8 |
| 7,136,779 B2 | * | 11/2006 | Nitsche et al. .............. 702/183 |
| 2001/0023393 A1 | * | 9/2001 | Hagiwara et al. .............. 703/8 |
| 2003/0115037 A1 | * | 6/2003 | Sumida ........................ 703/22 |
| 2004/0002803 A1 | * | 1/2004 | Lee et al. ..................... 701/59 |
| 2004/0163014 A1 | * | 8/2004 | Correa ......................... 714/35 |

FOREIGN PATENT DOCUMENTS

| | | |
|---|---|---|
| GB | 1288086 | 10/1969 |
| GB | 2 241 201 A | 8/1991 |
| GB | PCT/GB00/0027 | 1/2000 |
| JP | 09133160 A * | 5/1997 |
| JP | 2003222233 A * | 8/2003 |

OTHER PUBLICATIONS

"Design of Computer Experiments for Open-Loop Control and Robustness Analysis of Clutch to Clutch Shifts in Automatic Transmission" by Albert Yoon et al; Proceedings of American Control Conference, Jun. 1997 AACC.*

Modelling And Simulation Of Automotive Vehicle Systems Jones, R.P.; Simulation of Dynamical Systems, IEE Colloquium on□□Apr. 2, 1990 pp. 15-18.*

Virtual test track Hyeongcheol Lee; Vehicular Technology, IEEE Transactions on□□vol. 53, Issue 6, Nov. 2004 pp. 1818-1826.*

Vehicle Modeling and Simulation in the Duisburg Mechatronics Laboratory ; D. Adamski, R. Bardini, T. Bertram, C. Hrsken, O. Lange, U. Roll et al; date unknown.*

Adams/Car Templates—2001—103 Pgs.*

AVEC 94, Proceedings of the International Symposium on Advanced Vehicle Control 1994, The Auditorium of Tsukuba Research Center, Aist, Miti, Oct. 1994. pp. 224-229.

No. 983, Hardware-In-the-Loop Simulation System for Developing and Testing Electronically Controlled Transmission Units (Nissan Diesel Motor Co., Ltd.) May 1998. pp. 113-116.

* cited by examiner

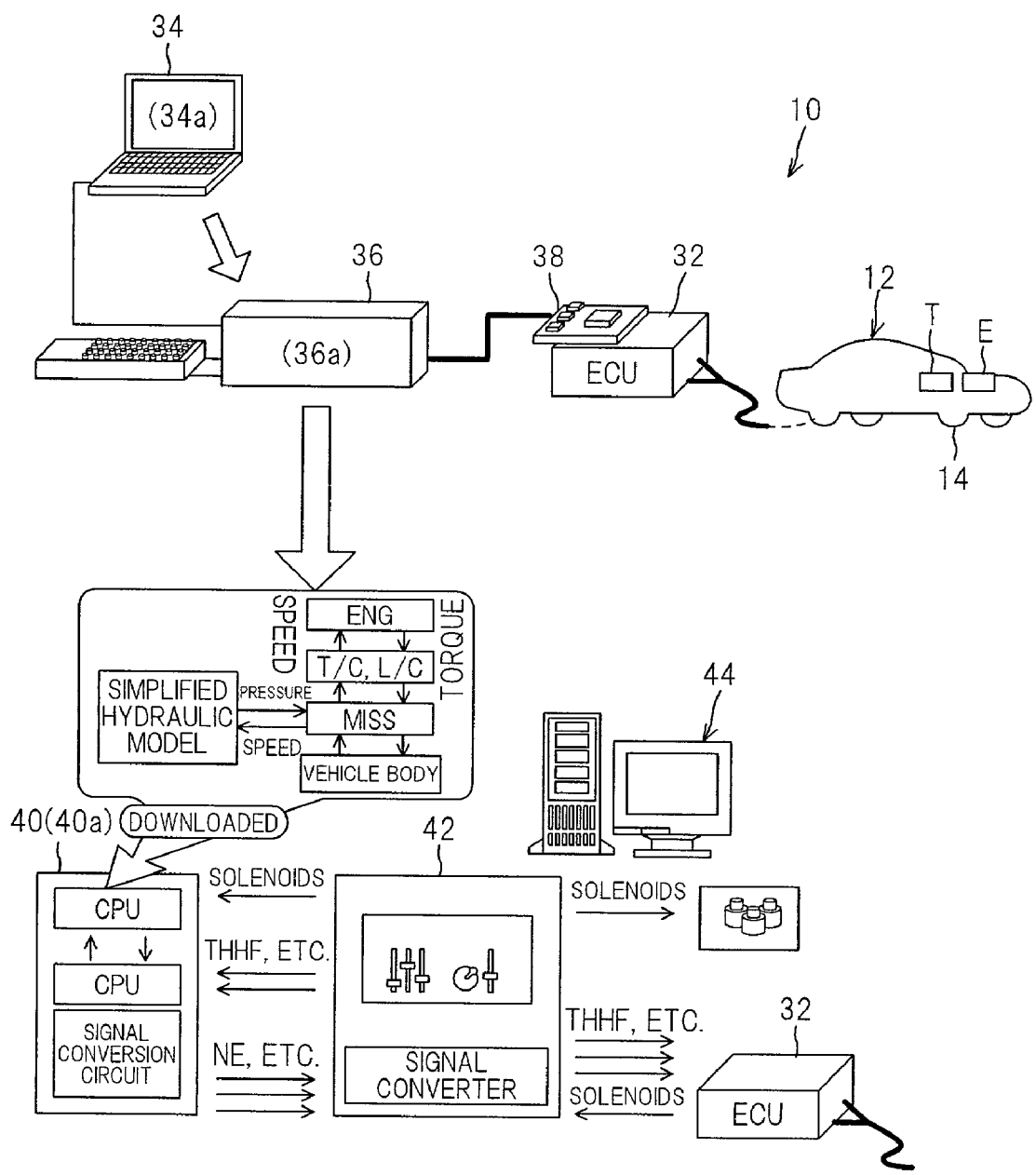

FIG. 2

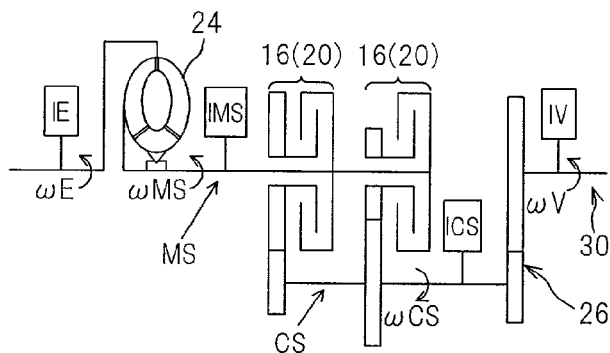

$TE - TP - IE \cdot \dot{\omega}E = 0$    (1)

$TP = \tau \cdot ((\omega E / 2\pi) \cdot 60/1000)^2$    (2)

$TMS = k \cdot TP$    (3)

$TMS - TL - TH - IMS \cdot \dot{\omega}MS = 0$    (4)

$TCS - TL \cdot iL - TH \cdot iH + ICS \cdot \dot{\omega}CS = 0$    (5)

$TDS = TCS \cdot IF$    (6)

$TDS - TV - IDS \cdot \dot{\omega}V = 0$    (7)

ICS: COUNTERSHAFT INERTIA MOMENT
IE: ENGINE INERTIA MOMENT
IMS: MAIN SHAFT INERTIA MOMENT
IV: MOMENT CORRESPONDING TO VEHICLE INERTIA
IDS: DRIVESHAFT INERTIA MOMENT
iF: FINAL REDUCED GEAR RATIO
iH: GEAR RATIO TO BE SHIFTED TO
iL: GEAR RATIO SHIFTED FROM
$\omega$CS: COUNTERSHAFT SPEED
$\omega$E: ENGINE SPEED
$\omega$MS: MAIN SHAFT SPEED
$\omega$V: DRIVESHAFT SPEED
TCS: COUNTERSHAFT TORQUE
TE: ENGINE TORQUE
TH: TRANSMISSION TORQUE OF CLUTCH TO BE SHIFTED TO
TMS: MAIN SHAFT TORQUE
TL: TRANSMISSION TORQUE OF CLUTCH SHIFTED FROM
TP: TORQUE CONVERTER'S PUMP MEMBER TORQUE
TV: RUNNING RESISTANCE
TDS: DRIVESHAFT TORQUE
k: TORQUE CONVERTER'S TORQUE RATIO
$\tau$: TORQUE CONVERTER'S PUMP ABSORPTION TORQUE AMOUNT COEFFICIENT

| PHASE | MAIN SHAFT MS | | COUNTERSHAFT CS | |
|---|---|---|---|---|
| LOW-GEAR DRIVING | $TMS = TL$ | (8) | $TCS = TMS \cdot iL$ | (9) |
| TORQUE PHASE | $TMS = TH + TL$ | (10) | $TCS = TMS \cdot iL - TH \cdot (iL - iH)$ | (11) |
| INERTIA PHASE | $TMS = TH - IMS \cdot \dot{\omega}MS$ | (12) | $TCS = TH \cdot iH$ | (13) |
| HIGH-GEAR DRIVING | $TMS = TH$ | (14) | $TCS = TMS \cdot iH$ | (15) |

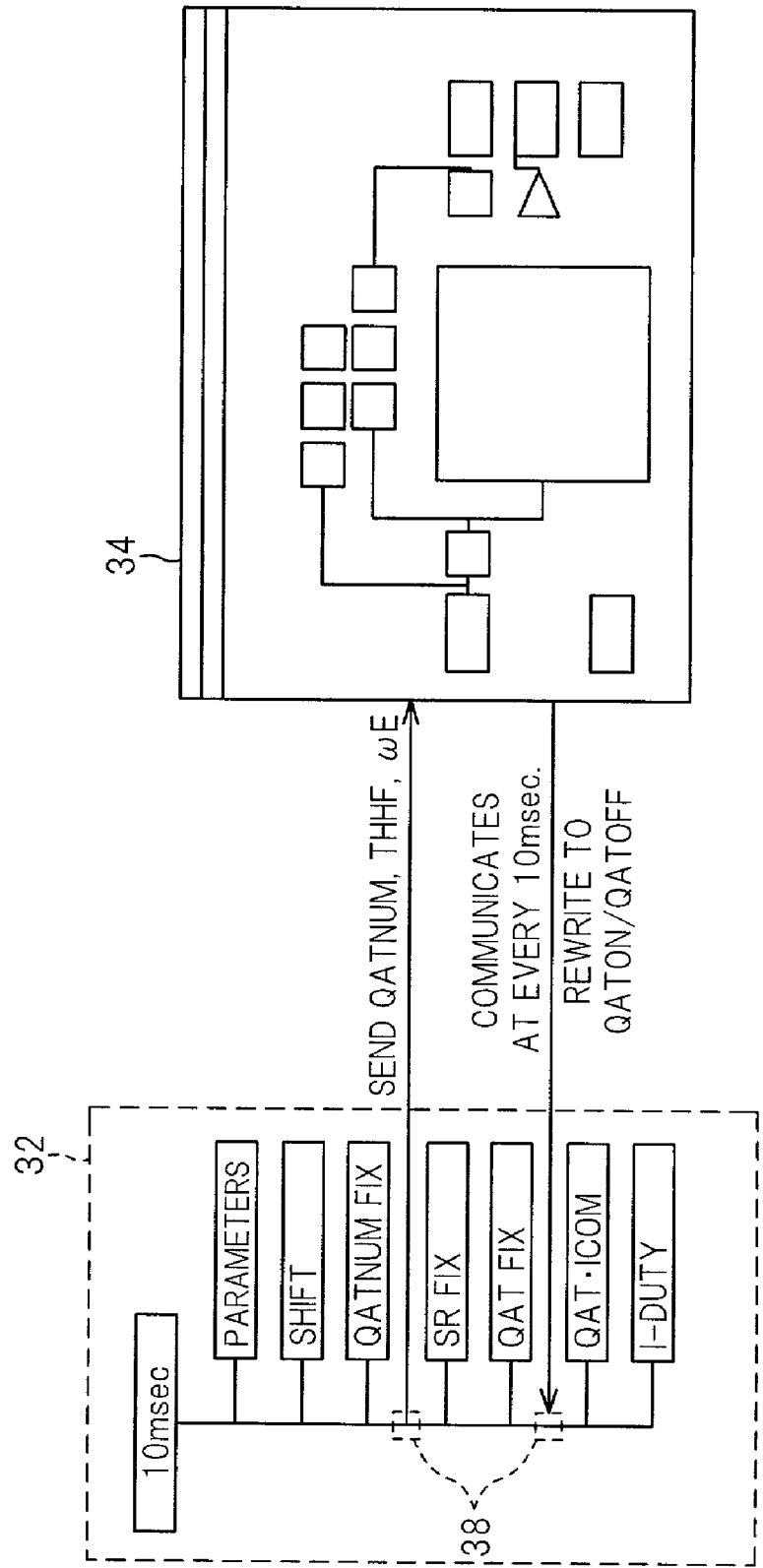

FIG. 26A
| 34up | 1/8 | 2/8 | 4/8 | 6/8 | 8/8 |
|---|---|---|---|---|---|
| 23up | 1/8 | 2/8 | 4/8 | 6/8 | 8/8 |
| 12up | 1/8 | 2/8 | 4/8 | 6/8 | 8/8 |
| muhon | 0.147 | 0.145 | 0.133 | 0.123 | 0.125 |
| muhoff | 0.15 | 0.14 | 0.14 | 0.13 | 0.14 |
| munon[rpm] | 300 | 600 | 600 | 600 | 1300 |
| munoff[rpm] | 50 | 50 | 50 | 50 | 50 |
| TE CORRECTION BEFORE SHIFTING[kgf·m] | −1 | −1 | −1 | −1 | −1 |
| TE CORRECTION AFTER SHIFTING[kgf·m] | −1 | −1 | −1 | −1 | −1 |
FIG. 26B
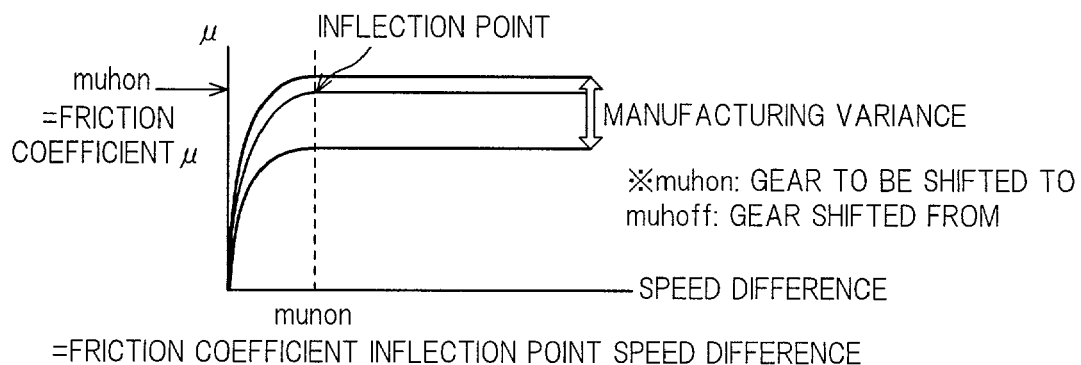
FIG. 26C
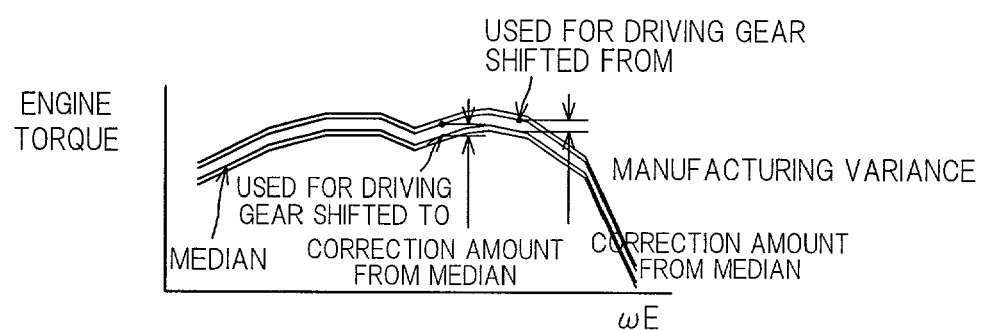

FIG. 34
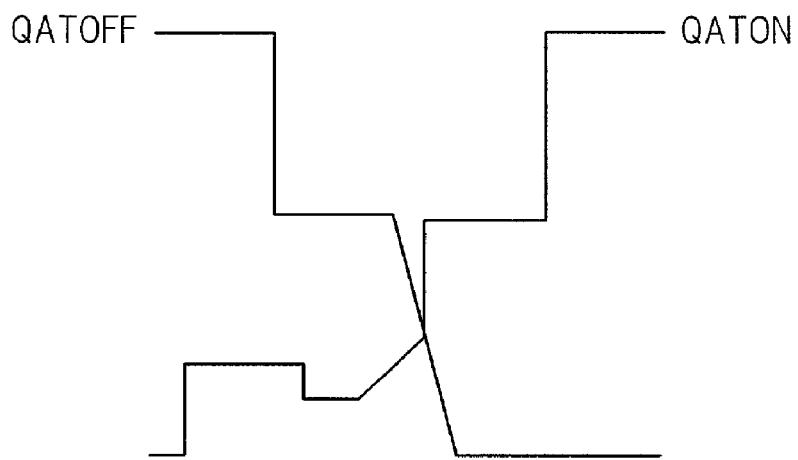
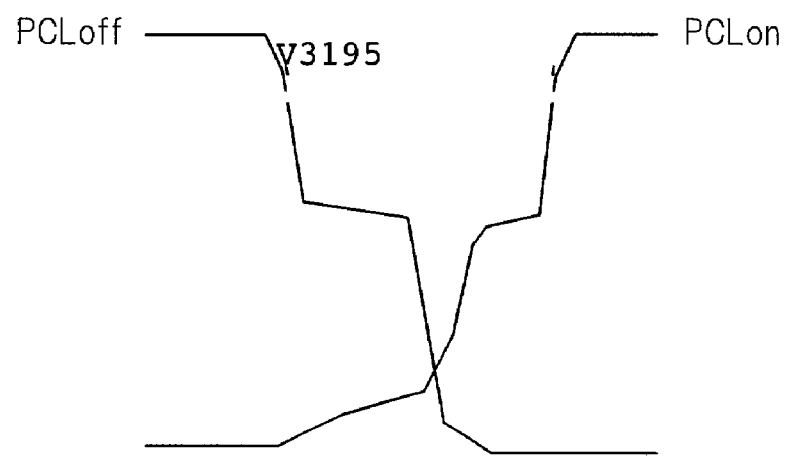
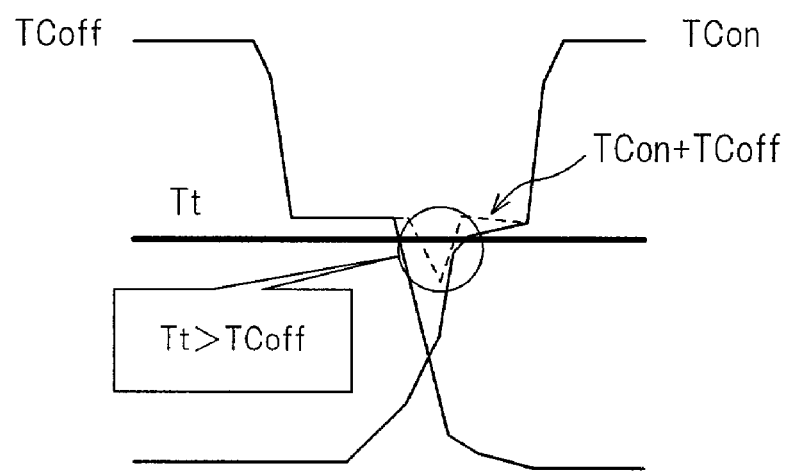

FIG. 35
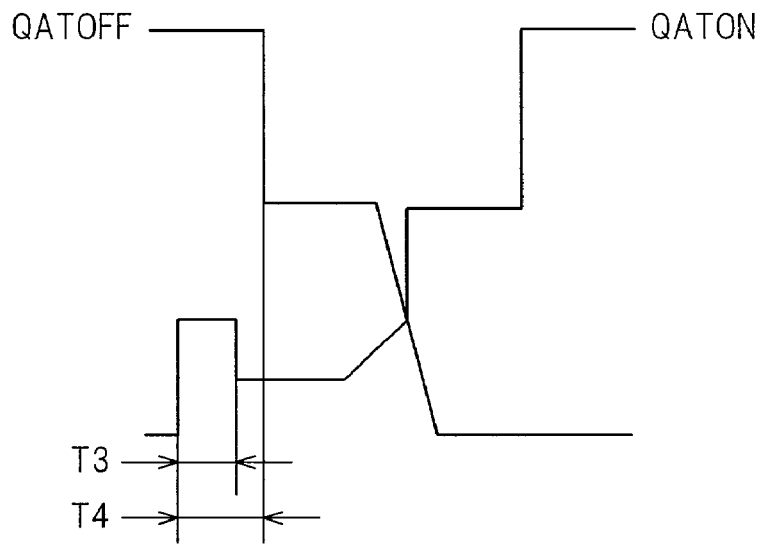
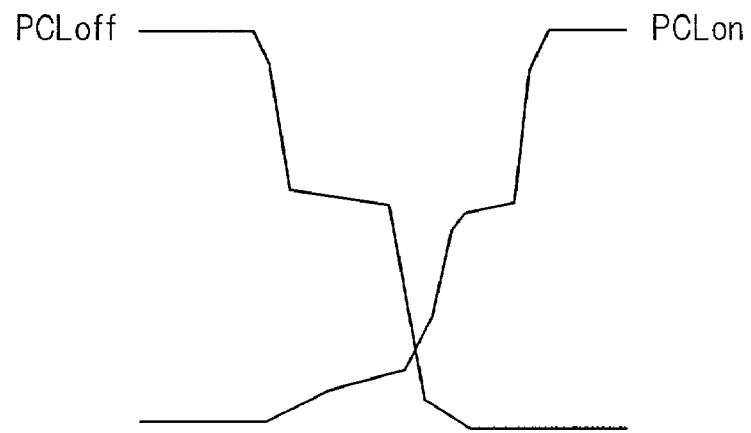
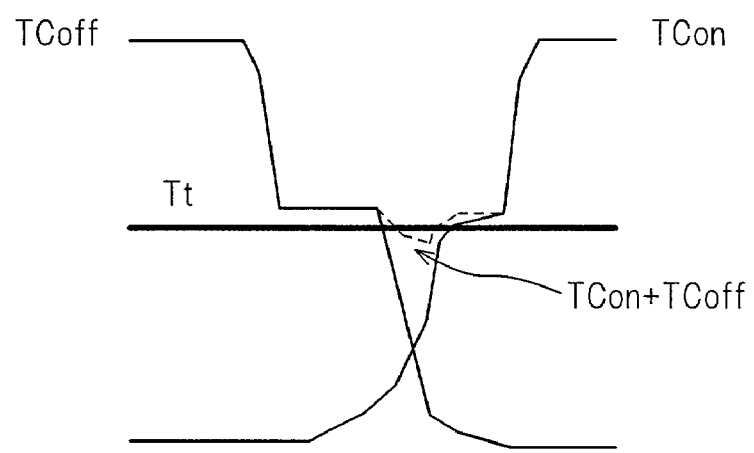

FIG. 37
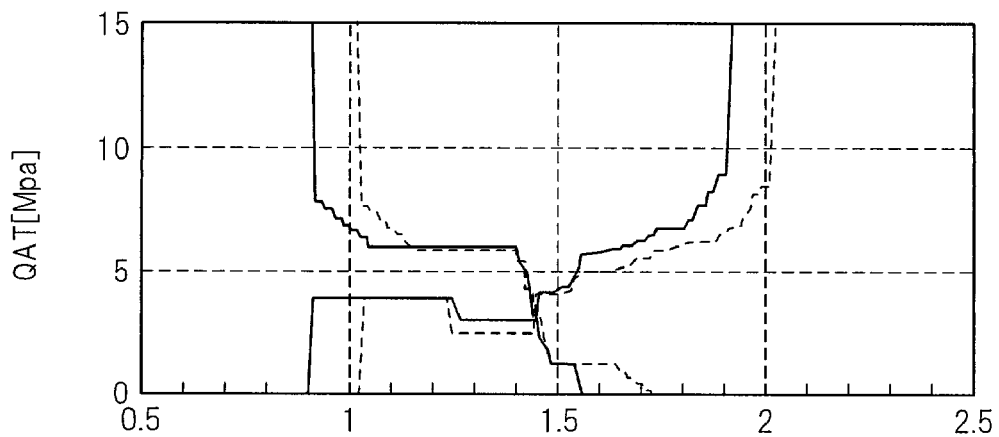
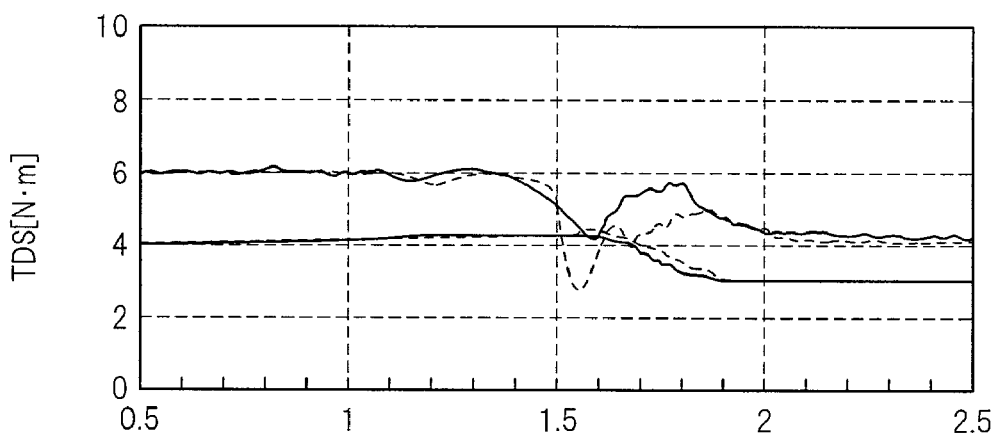
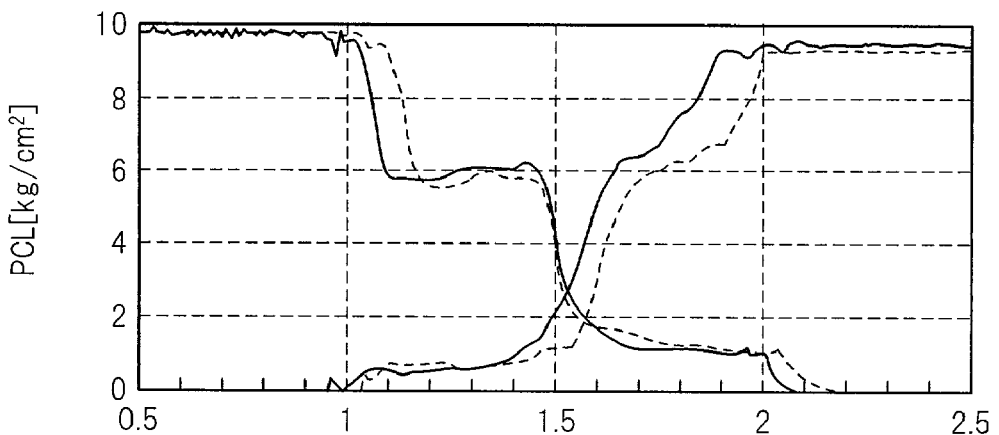

SIMULATOR FOR AUTOMATIC VEHICLE TRANSMISSION CONTROLLERS

BACKGROUND OF THE INVENTION

1. Field of the Invention

This invention relates to a simulator for automatic vehicle transmission controllers.

2. Description of the Related Art

As a simulator for automatic vehicle transmission controllers, it is known to analyze the behavior of the hydraulic pressure of a 5-speeds automatic vehicle transmission with planetary-gear set (AVEC' 94; October in 1994). Also, it is known to use a simulator named "Hardware In the Loop Simulation" (HILS) which incorporates an Electronic Control Unit (ECU) mounted on a vehicle with the simulator (manuscript No. 983 of the conference held on May in 1998 held by Society of Automotive Engineers of Japan). Thus, there have hitherto been proposed simulators which analyze the shift control algorithm.

In automatic vehicle transmissions, the clutch (frictional engaging elements) has a clearance where hydraulic fluid (oil) flows in and out. Since the clearance is occupied with a mixture of fluid and air, the clearance becomes a kind of black box or a dead volume. Accordingly, in order to accurately analyze the behavior of the clutch including a play-removing clutch piston stroke for removing the play in the clearance, the simulator sampling time (interval) must be set to a quite short time such as 1 μsec. As a result, the simulator must repeat calculation most frequently and hence, it needs much time to simulate even one shifting (gear shifting).

Further, even if it becomes possible to ideally model the behavior of a clutch including its play-removing clutch piston stroke, the model can only be applied to the clutch modeled and would not be applied another clutch that is different from the modeled one.

For these reasons, no conventional simulator for a controller of an automatic vehicle transmissions having frictional engaging elements such as clutches, can simulate shift control algorithm stored in the controllers and evaluates the same in a time equal to that of a real shift (gear shifting) or even in a time close thereto.

Furthermore, there is a need of a general-purpose simulator for a controller of an automatic vehicle transmissions having frictional engaging elements, which can simulate shift algorithm stored in the controllers in a constant time for different frictional engaging elements. However, there has not hitherto been proposed such a general-purpose simulator.

Aside from the above, in order to conduct a durability (life) test of an automatic transmission and to evaluate the quality of the product, an automatic transmission for testing is usually built and a preliminary test is conducted thereon. Then, the transmission is placed on a bench and is connected with an internal combustion engine of a vehicle on which the transmission is mounted. The bench test is continued for relatively long period of time (e.g. several months).

Thus, it has hitherto taken much time and costs to develop a new automatic transmission including cost for building the transmission for testing. In particular, since the development of a new automatic transmission must be paced with that of other components of the vehicle, the conventional testing leaves much to be improved in the efficiency of development.

SUMMARY OF THE INVENTION

A first object of this invention is therefore to overcome the aforesaid problems and to provide a simulator for controllers of an automatic vehicle transmission having frictional engaging elements, which can simulate shift control algorithm stored in the controllers to evaluate the same in a time close to that of a real shift (gear shifting).

A second object of this invention is to provide a simulator for controllers of an automatic vehicle transmission having frictional engaging elements, which can simulate shift control algorithm stored in the controllers in a constant time for different frictional engaging elements.

A third object of the invention is to provide a simulator for controllers of an automatic vehicle transmission, which can markedly improve the efficiency of development.

In order to achieve the objects, there is provided, in a first aspect, a simulator having computer-aided design programs for simulating a shift control algorithm stored in a shift controller of an automatic transmission mounted on a vehicle and having a hydraulic actuator to transmit power generated by an internal combustion engine to drive wheels based on at least throttle opening and vehicle speed in accordance with the shift control algorithm, comprising: a control system design tool which is connected to the shift controller to inputs the shift control algorithm and which outputs a hydraulic pressure supply command based on the inputted shift control algorithm; a first simulator section which is connected to the control system design tool to inputs the hydraulic pressure supply command and which estimates an effective clutch pressure that is assumably generated in the hydraulic actuator in response to the hydraulic pressure supply command based on a first model describing entire system including the transmission; and a second simulator section which is connected to the control system design tool and the first simulator section and which determines transfer functions of a second model describing behavior of the hydraulic actuator such that an output of the second model converges the estimated effective hydraulic pressure; wherein the second simulator section simulates and evaluates the shift control algorithm based on a third model obtained by incorporating the second model with the first model.

In order to achieve the objects, there is provided, in a second aspect, a simulator having computer-aided design programs for simulating a shift control algorithm stored in a shift controller of an automatic transmission mounted on a vehicle and having a hydraulic actuator to transmit power generated by an internal combustion engine to drive wheels based on at least throttle opening and vehicle speed in accordance with the shift control algorithm, comprising: a control system design tool which is connected to the shift controller to inputs the shift control algorithm and which outputs a hydraulic pressure supply command based on the inputted shift control algorithm; a first simulator section which is connected to the control system design tool to inputs the hydraulic pressure supply command and which estimates an effective clutch pressure that is assumably generated in the hydraulic actuator in response to the hydraulic pressure supply command based on a first model describing entire system including the transmission; a second simulator section which is connected to the control system design tool and the first simulator section and which determines transfer functions of a second model describing behavior of the hydraulic actuator such that an output of the second model converges the estimated effective hydraulic pressure, the second simulator section simulates and evaluates the shift control algorithm based on a third model obtained by incorporating the second model with the first model, wherein the second simulator section includes: parameter extracting means for extracting a parameter having influence on durability of the transmission; undesirable shift phenomenon forecasting means for conducting simulation based on the third model, while changing the parameter and forecasting occurrence of undesirable phenomenon based on behavior change of the third model; and algorithm correcting means for correcting the shift control algorithm based on a result of forecasting.

BRIEF DESCRIPTION OF THE DRAWINGS

This and other objects and advantages of the invention will be made more apparent with reference to the following description and drawings, in which:

FIG. 1 is an overall schematic view of a simulator for automatic vehicle transmission controllers according to an embodiment of the invention;

FIG. 2 is a skeleton view showing the transmission, illustrated in FIG. 1, in a schematic form in which the transmission is simplified to two forward gears (speeds);

FIG. 3 is an explanatory view showing the communication between a control system design tool and an ECU illustrated in FIG. 1;

FIG. 26A to 26C are a set of view showing an example of the result of analysis of the transmission (test piece) referred to in the flow chart of FIG. 23;

FIG. 34 is a time chart similarly showing the processing of the flow chart of FIG. 31;

FIG. 35 is a time chart similarly showing the processing of the flow chart of FIG. 31;

FIG. 37 is a set of graphs, obtained by overlapping the graphs in FIGS. 30 and 36, similarly showing the situation where the occurrence of undesirable and troublesome shift phenomenon was removed by the processing referred to in the flow chart of FIG. 23.

DETAILED DESCRIPTION OF THE PREFERRED EMBODIMENTS

Figure 4:
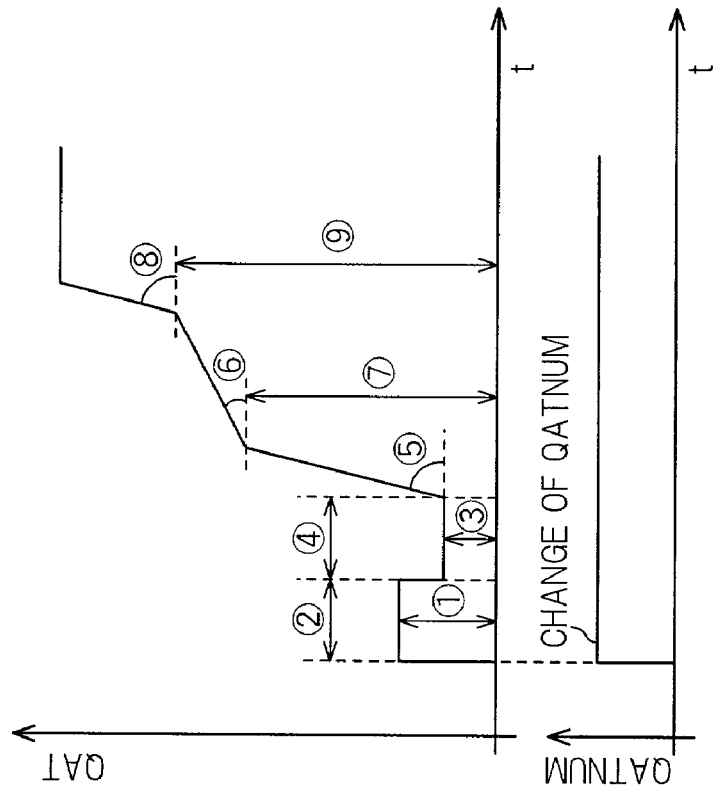
FIG. 4 is a time chart showing a hydraulic pressure supply command QATON to be supplied to the ON-side clutch, calculated and outputted from the control system design tool illustrated in FIG. 1.

An embodiment of the invention will now be explained with reference to the attached drawings.

FIG. 1 is an overall schematic view of a simulator for automatic vehicle transmission controllers according to the embodiment of the invention.

In the figure, reference numeral 10 indicates a simulator for a controller of an automatic vehicle transmission T which shifts gears based on at least the throttle opening THHF and the vehicle speed V in accordance with a shift control algorithm through hydraulic actuators including hydraulic clutches (frictional engaging elements; not shown) such that the transmission T transmits the output of an internal combustion engine E mounted on a vehicle 12 to driven wheels 14. The transmission T in this embodiment is a parallel-installed-shaft-type one having five forward gears (speeds) and one reverse gear.

FIG. 2 is a skeleton view showing the transmission T in a schematic form in which the transmission T is simplified to two forward gears (speeds).

The transmission T of this type comprises a main shaft MS, a countershaft CS installed in parallel with the main shaft MS, and a group of gears 16 which are always meshed with each others and are each provided with a hydraulic clutch (frictional engaging element or hydraulic actuator) 20 associated therewith.

The engine torque taken from the crankshaft is transmitted to the main shaft MS through a torque converter 24 and is then transmitted to the driven wheels 16 (illustrated in FIG. 1) via the countershaft CS and a final speed-reducing gear 26 through the gears and the clutch associated thereto.

Equations of motion of these elements are illustrated in the figure. The shifting in the transmission T is conducted or implemented by relieving the clutch of the gear currently engaged and by engaging the clutch of the gear to be shifted to such that the gears are changed. The equations of equilibrium on the main shaft MS and the countershaft CS at the respective phases (mentioned at the bottom of the figure) in shift (more precisely, the transient conditions of gear shifting) are illustrated in the bottom of the figure. The shift is expressed by Eqs. 4 and 5 and events occurring in the order of low-gear driving, the torque phase, the inertial phase and high-gear driving.

Returning to the explanation of FIG. 1, the simulator 10 has a microcomputer 34, which is connected to a controller 32 (the controller hereinafter referred to "ECU" (Electronic Control Unit)) of the transmission T, and which stores a control system design tool (computer-aided design (CAD) programs or package) 34a. The control system design tool 34a inputs the aforesaid shift control algorithm of the ECU 32 and outputs a hydraulic pressure supply command QAT to be supplied to the clutch 20 concerned based on the inputted data. In addition, the control system design tool 34a designs or constructs models (modeling), downloads the designed models and monitors the behavior of the ECU 32, etc.

Explaining the ECU 32, the ECU 32 is to be provided with various sensors (not shown) when mounted on the vehicle 12 including a crank angle sensor which generates a signal indicative of the engine speed ωE, a manifold absolute pressure sensor which generates a signal indicative of the manifold absolute pressure (engine load), a throttle position sensor which generates a signal indicative of the throttle opening THHF of the throttle valve, a vehicle speed sensor which generates a signal indicative of the vehicle speed V and a shift lever position sensor which generates a signal indicative of the position of the shift lever selected by the vehicle operator, etc.

Further, the ECU 32 is to be provided with a first rotational speed sensor provided in the vicinity of the main shaft MS which generates a signal indicative of the rotational speed ωMS of the main shaft based on the rotation of the main shaft MS, a second rotational speed sensor provided in the vicinity of the countershaft CS which generates a signal indicative of the rotational speed ωCS of the countershaft based on the rotation of the countershaft CS, a temperature sensor installed in the transmission T or at another appropriate location which generates a signal indicative of the oil temperature, i.e., the temperature TATF of the Automatic Transmission Fluid, and a brake switch provided in the vicinity of a brake pedal (not shown) which generates an ON signal when the brake pedal is depressed by the vehicle operator.

The ECU 32 comprises a microcomputer having a CPU (central processing unit), a ROM (read-only memory), a RAM (random access memory), an input circuit, an output circuit, etc. and determines the gear (gear ratio) based on the detected throttle opening THHF and vehicle speed V in accordance with the shift control algorithm stored in the ROM. The ECU 32 then controls shifting by energizing or deenergizing electromagnetic solenoids including the linear solenoids and shift solenoids provided in a hydraulic circuit (explained later) connected to each clutch 20 such that the determined gear is established, when mounted on the vehicle 12.

Since the characteristic features of the invention reside in the simulator 10, more detained explanation of the shift control performed by the ECU 32 is omitted.

The simulator 10 has a second microcomputer 36 which stores a first simulator section 36a. The first simulator section 36a inputs the hydraulic pressure supply command QAT and calculates an estimated effective clutch pressure (which is assumably generated in the clutch 20 in response to the hydraulic pressure supply command QAT) based on a shift-simulation model (a first model). The first simulator section 36a also comprises a computer-aided design (CAD) programs or package. The second microcomputer 36 has a performance faster by 10 times or more in integer calculation than that constituting the ECU 32.

In the configuration illustrated in FIG. 1, the control system design tool 34a is connected to the ECU 32 through the second microcomputer 36 (which contains the first simulator section 36a). More specifically, a dual-port RAM 38 is provided between the ECU 32 and the second microcomputer 36 and the dual-port RAM 38 acts to communicates (as interrupt) between the ECU 32 and the second microcomputer 36. The second microcomputer 36 (i.e., the first simulator section 36a) inputs the model designed in the control system design tool 34a and communicates with the ECU 32 through the dual-port RAM 38 at every 10 msec.

More specifically, at every 10 msec., the control system design tool 34a inputs a shift signal QATNUM (shift command to upshift to or downshift from n-th gear), the throttle position THHF and the engine speed ωE, calculate the hydraulic pressure supply command QAT based on the inputted data, and outputs the same to the ECU 32, as illustrated in FIG. 3.

Based on the inputted hydraulic pressure supply command QAT, the ECU 32 calculates a current command (hereinafter referred to as "IACT") to be supplied to the linear solenoids (electromagnetic solenoids) to energize or deenergize so as to drive the clutch 20 concerned.

Figure 5:
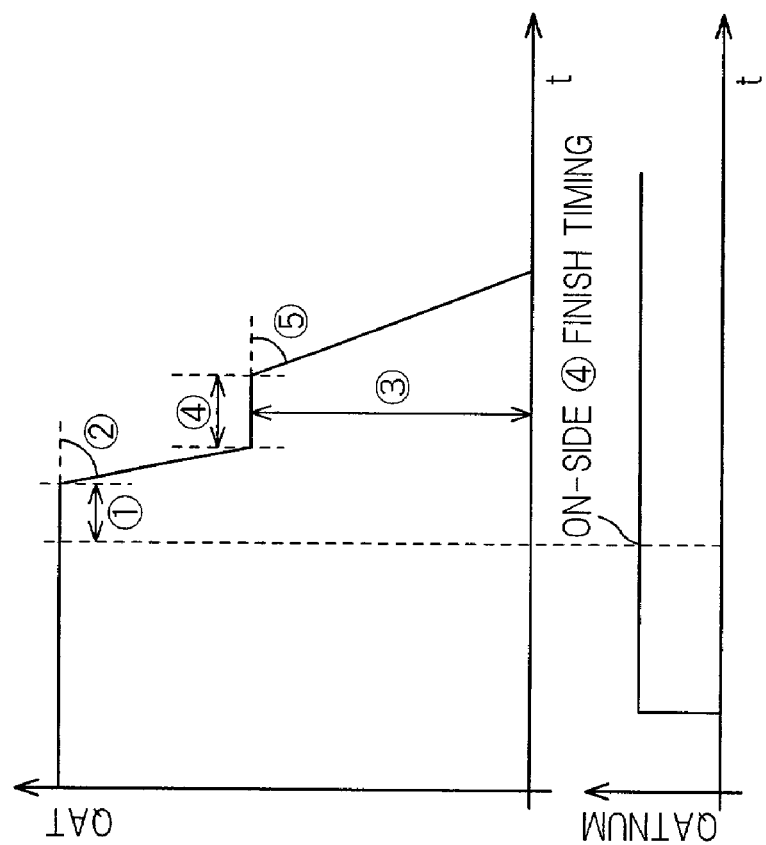
FIG. 5 is a time chart showing a hydraulic pressure supply command QATOFF to be supplied to the OFF-side clutch, calculated and outputted from the control system design tool illustrated in FIG. 1.

More precisely, the hydraulic pressure supply command QAT comprises an ON-side hydraulic pressure supply command QATON to be supplied to the clutch 20 to be engaged and an OFF-side hydraulic pressure supply command QATOFF to be supplied to the clutch 20 to be disengaged (relieved). FIG. 4 shows the command QATON and FIG. 5 shows the command QATOFF. These hydraulic pressure supply commands are outputted with respect to time t.

In the configuration shown in FIG. 1, the first simulator section 36a inputs the hydraulic pressure supply command QAT (indirectly outputted by the ECU 32) from the control system design tool 34a, and measures the clutch hydraulic pressure based on the shift control algorithm for testing. After completing the measurement, the first simulator section 36a calculates offline the estimated effective clutch pressure (estimated effective pressure) which is assumably generated in the clutch 20 in response to the hydraulic pressure supply command QAT (more preciously, in response to the current command IACT.

Further, based on a second model (explained later) describing the clutch behavior, the simulator 10 inputs the hydraulic pressure supply command QAT (more precisely the current command IACT) outputted by the ECU 32 and determines a gain (transfer function) α2 of the second model such that output pressure (calculated in response to the inputted data correspond to the input of the model) begins to increase after a predetermined period of time (transfer function) α1 (obtained by measuring the behavior of the clutch 20) and then converges to the aforesaid estimated effective clutch pressure (estimated effective pressure).

Further, the simulator 10 simulates and analyzes/evaluates the shift control algorithm on a real-time basis based on a third model (explained later) which incorporates the second model therewith, and has a third microcomputer 40 in which a second simulator section 40a is stored. The second simulator section 40a also comprises a computer-aided design (CAD) programs or package.

The third microcomputer 40 has a performance faster by 100 times or more in integer calculation than that of the ECU 32. The third microcomputer 40 (which stores the second simulator section 40a) is connected to the ECU 32 through an input/output interface 42. The shift control algorithm stored in the ECU 32 is inputted to the third microcomputer 40 through the input/output interface 42 and is stored in its memory.

The input/output interface 42 generates pseudo signals of the linear solenoids and the shift solenoids and outputs the same to the third microcomputer 40. The pseudo signals are signals to be used to actuate the hydraulic actuator (clutch 20 concerned) in the shift control algorithm for testing and in conducting the simulation explained later.

The second simulator section 40a stored in the third microcomputer 40 calculates outputs of the third model (a driveshaft torque TDS, the engine speed ωE, a clutch pressure PCL, etc.) based on the shift control algorithm, to be generated in response to the pseudo signals (and other pseudo signals indicating at least the throttle opening THHF and the vehicle speed V. Then, the second simulator section 40a analyzes and evaluates the shift control algorithm stored in the ECU 32, and demonstrates the result of the analysis and emulation through a display (not shown).

In FIG. 1, the reference numeral 44 indicates a host computer (offline computer) which also constructs or design models and downloads the same on the third microcomputer 40 and sets data for the simulation, etc.

Based on the above, the operation of a simulator for automatic vehicle transmission controllers according to this embodiment of the invention will be explained with reference to the flow chart of FIG. 6.

The program begins in S10 in which a model for testing (hydraulic circuited design model) is designed or constructed, i.e., preparation for testing is conducted using the host computer 44. The hydraulic circuit design model is a model which describes the behavior of the hydraulic circuit of the hydraulic actuators (such as the clutches) and is designed or constructed by the host computer 44.

Figure 7:
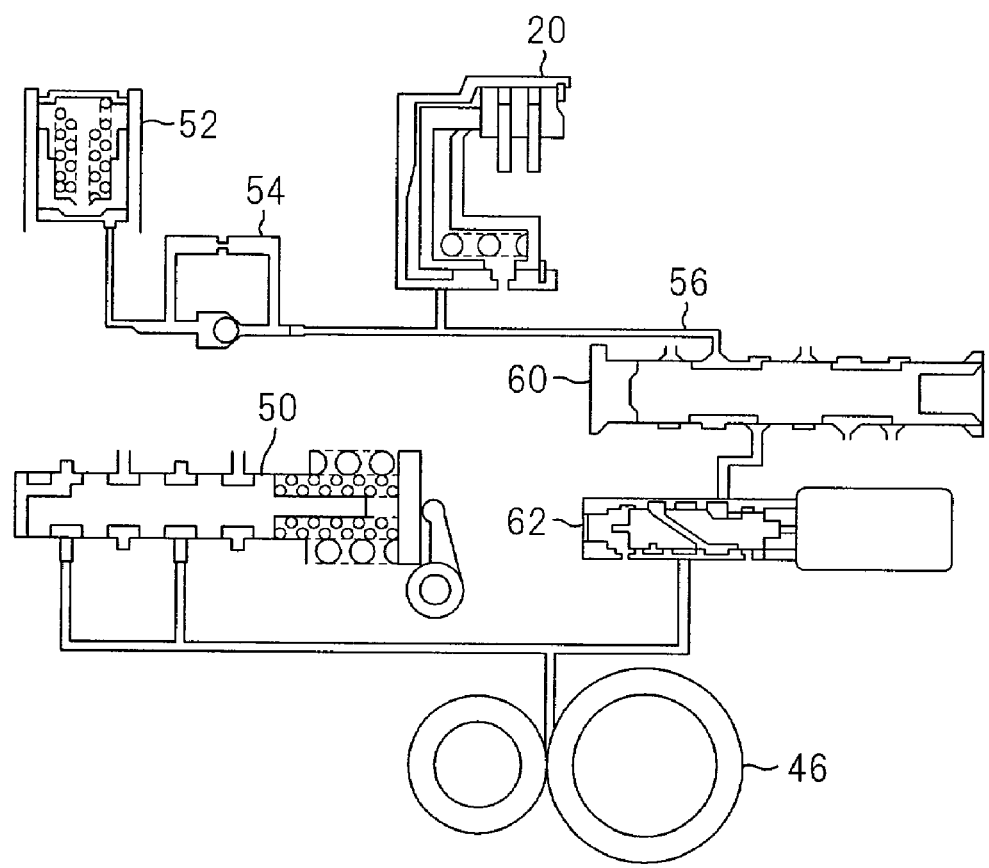
FIG. 7 is an explanatory view partly showing the configuration of a hydraulic circuit design model referred to in the flow chart of FIG. 6.

FIG. 7 is a hydraulic circuit diagram partly showing the configuration of this hydraulic circuit design model. As mentioned above, the transmission T has the structure of parallel-installed-shaft type of five forward gears and one reverse gear and hence, has one clutch for each gear. FIG. 7 illustrates a part of the model concerning one of the clutches 20 such as the clutch for 3rd gear.

Outlining the configuration in the figure, the fluid (oil; ATF) pumped by an oil pump 46 from the reservoir (not shown) is regulated to a predetermined high pressure by a regulator valve 50 and is then supplied to the clutch 20 through an accumulator 52 and an orifice 54. A shift valve 60 and the aforesaid linear solenoid (designated by reference numeral 62) are provided at a path 56 connecting the regulator valve 50 and the clutch 20, which regulates the pressure supply to the clutch 20.

Figure 6:
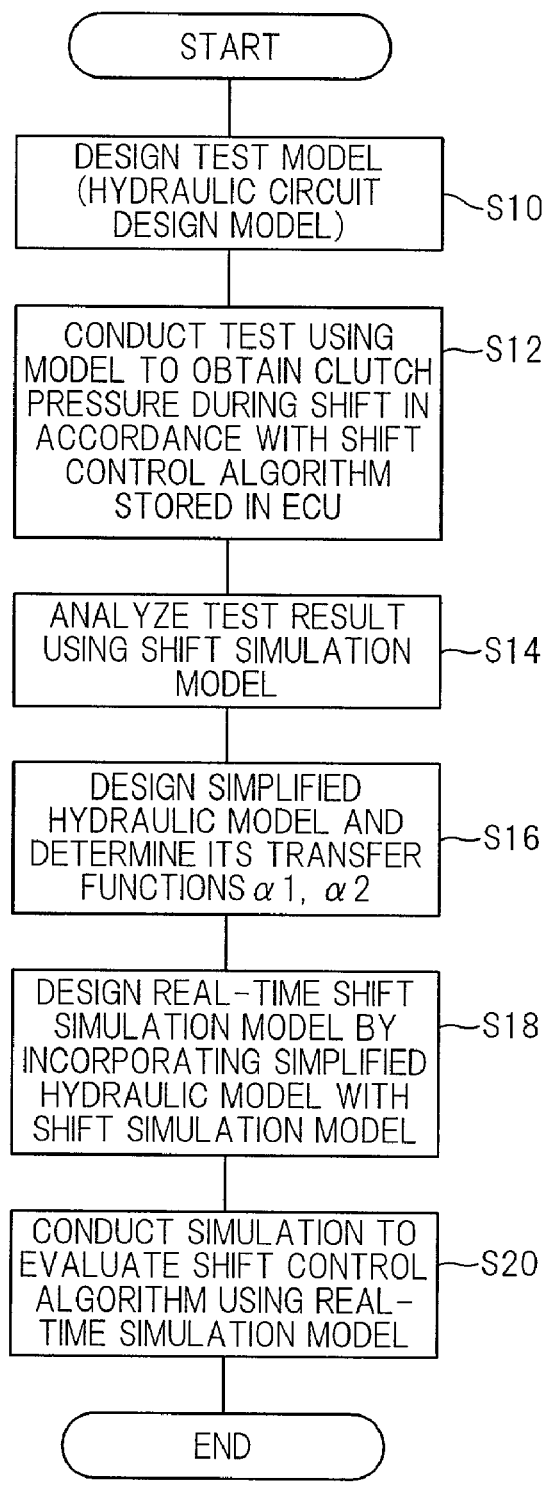
FIG. 6 is a flow chart showing the operation of a simulator for automatic vehicle transmission controllers illustrated in FIG. 1.
Figure 8:
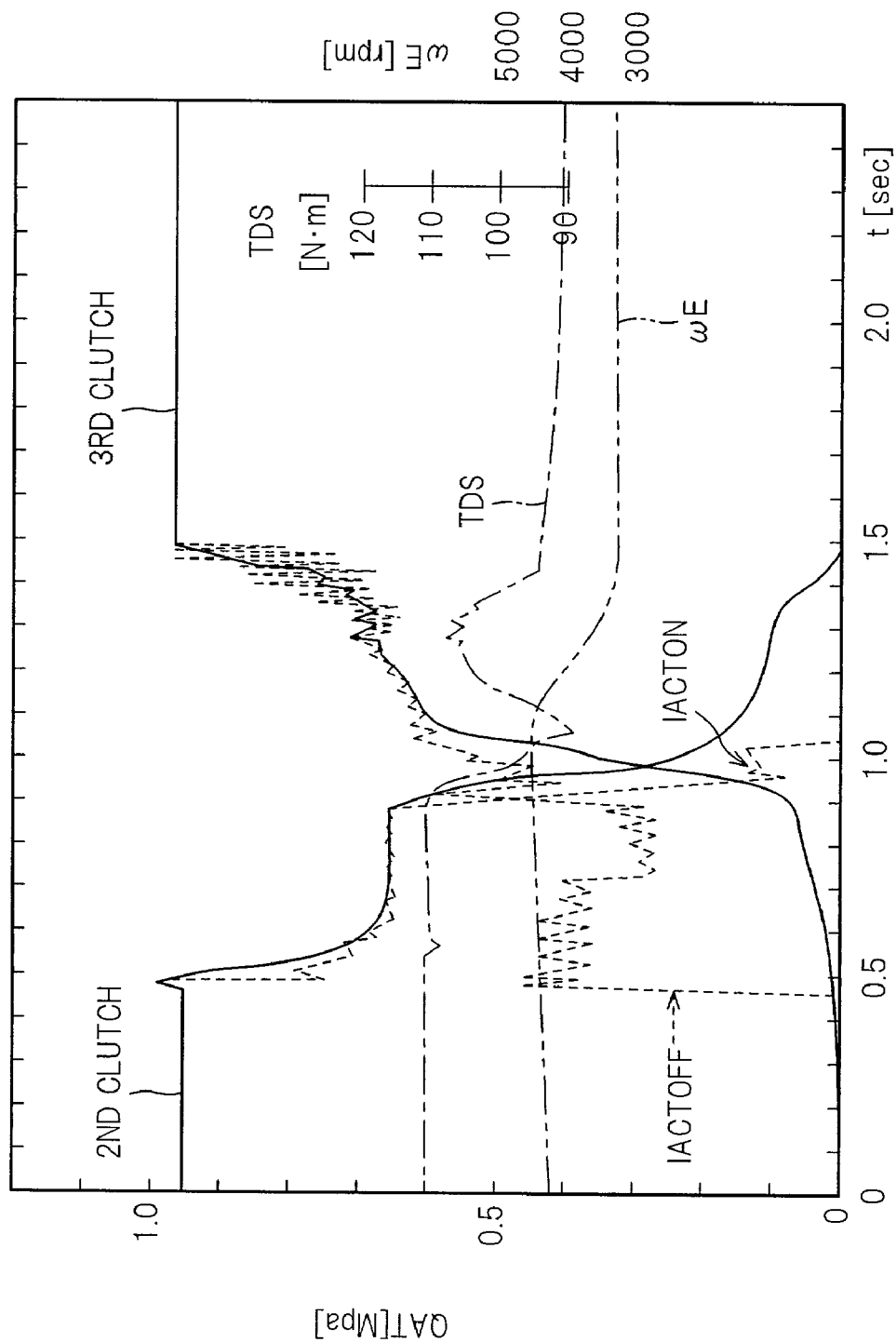
FIG. 8 is a graph showing the result of testing referred to in the flow chart of FIG. 6.

Returning to the explanation of the flow chart of FIG. 6, the program proceeds to S12 in which the test is conducted in the system mentioned with reference to FIG. 1 and constituted by the ECU 32, the control system design tool 34a and the first simulator section 36a using the model to obtain hydraulic pressure (wave form) during shifting which is generated or outputted in response to current supply command IACT generated based on the hydraulic pressure supply command QAT (more precisely, the commands QATON and QATOFF) in accordance with the shift control algorithm stored in the ECU 32. Simply saying, this amounts for grasping or recognizing events occurred in the vehicle 12. FIG. 8 shows the results of testing.

In the flow chart of FIG. 6, the program then proceeds to S14 in which the result of test is analyzed. Specifically, this is done in the first simulator section 36a, by calculating the aforesaid estimated effective clutch pressure which is estimated to be generate in the clutch 20 of the transmission T in response to the hydraulic pressure supply command QAT (more precisely, the current supply command IACT), with the use of the aforesaid shift simulation model (first model).

Figure 9:
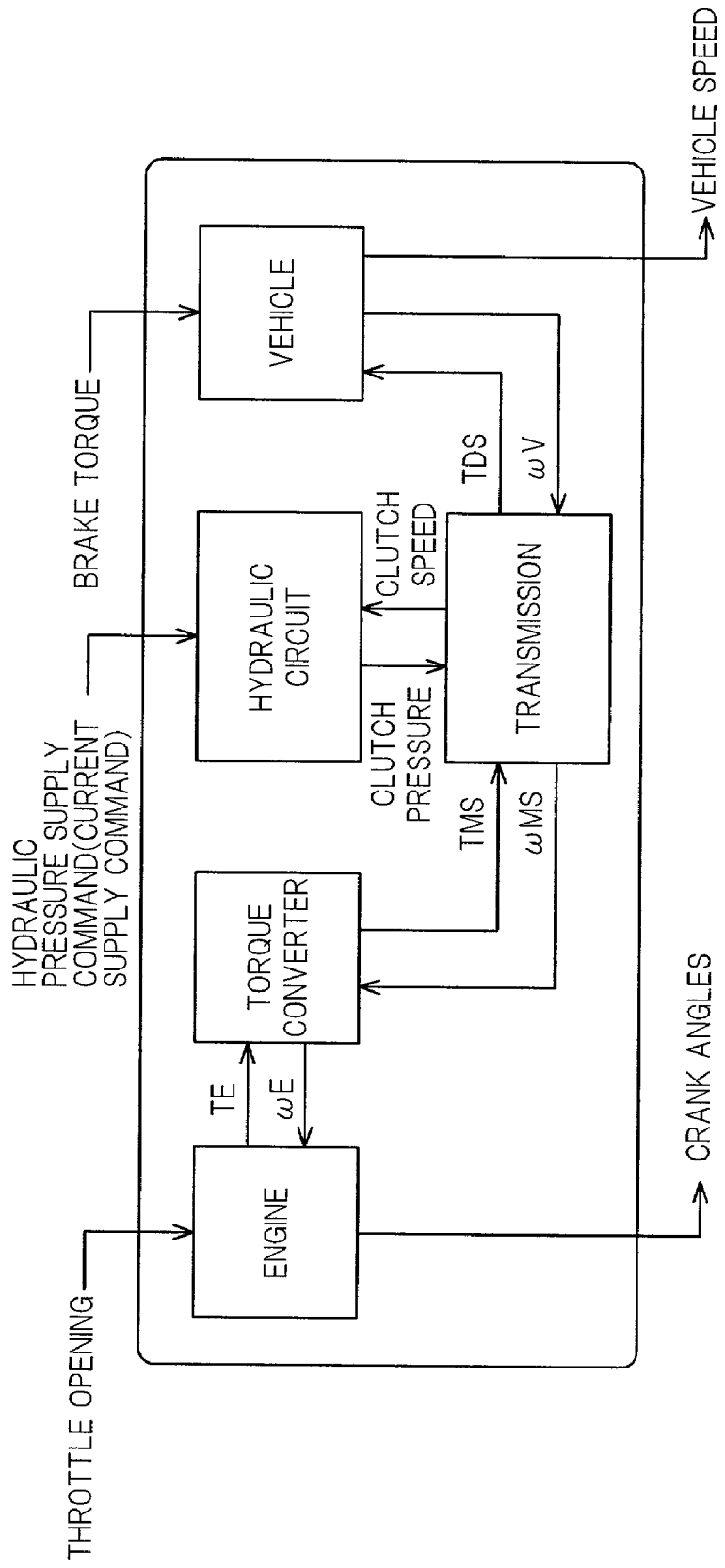
FIG. 9 is a block diagram showing the details of a shift simulation model referred to in the flow chart of FIG. 6.

FIG. 9 is a block diagram showing the details of the shift simulation model.

Based on the equations of motion of the parallel-installed-shaft transmission T illustrated in FIG. 2 in the simplified form, the entire system ranging from the engine E to the vehicle (vehicle body) 12 can be modeled as illustrated in FIG. 9. In this figure, "ENGINE" indicates a model describing the behavior of the engine E; "TORQUE CONVERTER" indicates a model describing the behavior of the torque converter 24; "TRANSMISSION" indicates a model describing the behavior of the transmission T; "VEHICLE" indicates a vehicle body model describing the behavior of the vehicle 12; and "HYDRAULIC CIRCUIT" is the hydraulic circuit design model partly illustrated in FIG. 7.

In the configuration illustrated in FIG. 9, the output torque TE outputted from the engine model is converted in the torque converter model and is then inputted to the transmission model. The driveshaft torque TDS outputted from the transmission model is inputted to the vehicle body model. The vehicle body model outputs a driveshaft speed ωV (corresponding to the vehicle speed V). The transmission model inputs the driveshaft speed ωV and outputs the main shaft speed ωMS. The outputted value is then converted in the torque converter model which outputs the engine speed ωE (corresponding to NE) and sends the same to the engine model. At the same time, the engine torque TE is converted into a main shaft torque TMS through the torque converter model.

As mentioned above, the shift (specifically, gear shifting, more specifically, the transient conditions of gear shifting) is expressed by Eqs. 4 and 5. The shift shock experienced by the vehicle operator in the transient conditions of gear shifting is the change in acceleration in the vehicle forwarding direction expressed by Eq. 7 illustrated in FIG. 2. In the transient conditions of gear shifting, since the change in vehicle speed is slight and hence the running resistance can be assumed to be constant, the magnitude of degree of the shift shock is proportional to the driveshaft torque TDS.

Since the details of this simulation model and the simulation using this model is described in U.S. patent application Ser. No. 09/802,974, filed on Mar. 12, 2001 in which the entire disclosure of U.S. patent application No. Ser. 09/802, 974 is incorporated herein by reference in its entirety, and therefore no further explanation will be made here.

In S14 of the flow chart of FIG. 6, the (estimated) effective clutch pressure PCL is thus calculated back from the driveshaft torque TDS of the vehicle 12, the hydraulic pressure and the speed based on Eqs. 8 to 15 illustrated in FIG. 2.

Figure 10:
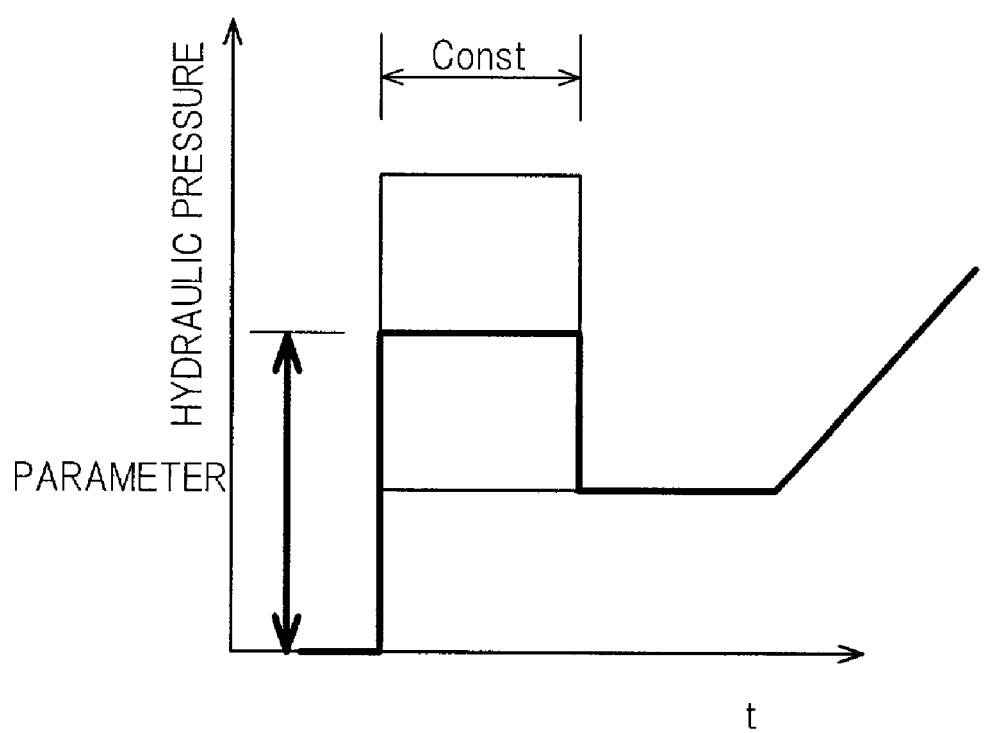
FIG. 10 is a time chart showing the condition for inputting of the hydraulic pressure supply command in the analysis of testing referred to in the flow chart of FIG. 6.
Figure 11:
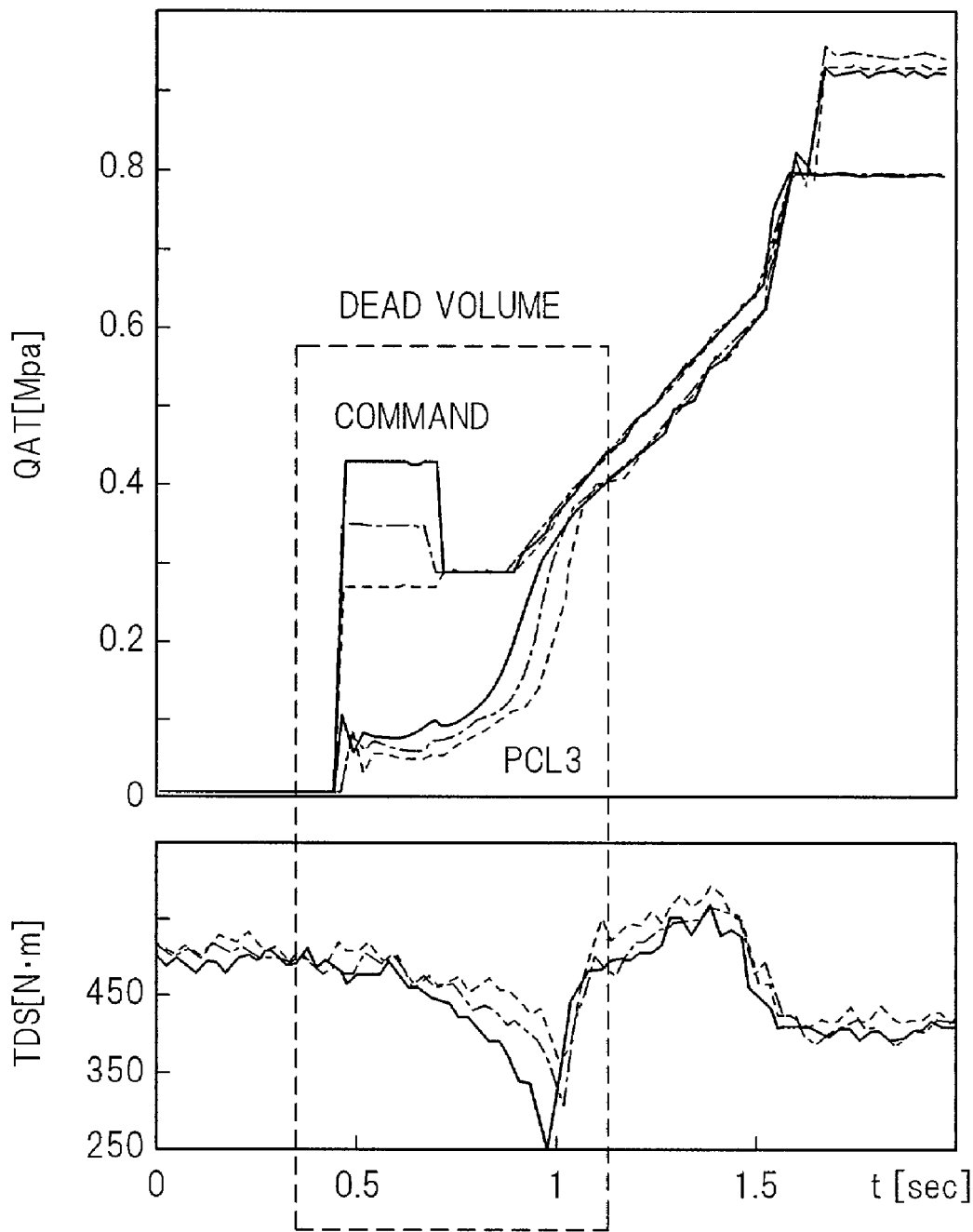
FIG. 11 is a set of graphs showing an estimated effective clutch pressure which is estimated to be generated in the clutch in response to the hydraulic pressure supply command referred to in the flow chart of FIG. 6.

Specifically, as illustrated in FIG. 10 (which is an enlarged view of a portion shown in FIG. 4), the hydraulic pressure supply command QAT is inputted and then, the estimated effective clutch pressure PCL which is estimated to be generated in the clutch 20 concerned (such as the third clutch) and the driveshaft torque TDS (more precisely, an estimated driveshaft torque TDS) are calculated as illustrated in FIG. 11.

More specifically, as illustrated in FIG. 10, while fixing a period of time Const during which the height of pressure should be kept flat, several values of the hydraulic pressure supply command QAT each indicating different heights of pressure are inputted. Then, several values of the estimated effective clutch pressure PCL and the driveshaft torque TDS (which are assumably to be generated in driving the vehicle 12 in a real world) are calculated.

Returning to the explanation of FIG. 6, the program proceeds to S16 in which a simplified hydraulic model is designed and its transfer functions are determined.

Specifically, as mentioned above, the simplified hydraulic model is designed or constructed and the transfer functions (the predetermined period of time which corresponds to a time necessary for the play-removing clutch stroke) α1 and the gain α2 are determined such that the inputted value (the current supply command IACT corresponding to the hydraulic pressure supply command QAT) converges to the output pressure (estimated effective clutch pressure PCL).

More specifically, the gain α2 of the simplified hydraulic model is determined such that the outputted value (calculated in response to the inputted value) begins to increase after the predetermined period of time α1 (obtained by measuring the behavior of the clutches 20) and then converges to the estimated effective clutch pressure PCL, and the predetermined period of time α1 and the gain α2 are stored in such a way that they can be retrieved from predetermined parameters.

Explaining this, as mentioned above, the clutch 20 has a clearance which is occupied with a mixture of fluid and air, the clearance becomes a kind of black box or a dead volume. For this reason, the response to the hydraulic pressure supply command indicative of this play-removing stroke at the beginning of shift, is poor. As a result, it has hitherto needed much time to set the data appropriately, acting a bar to shorten simulation time. In other words, in order to conduct simulation accurately, the second simulator section 40a must conduct necessary calculations with the use of a highly-accurate model. However, the calculation performance of the second simulator section 40a is not free from its performance.

Figure 12:
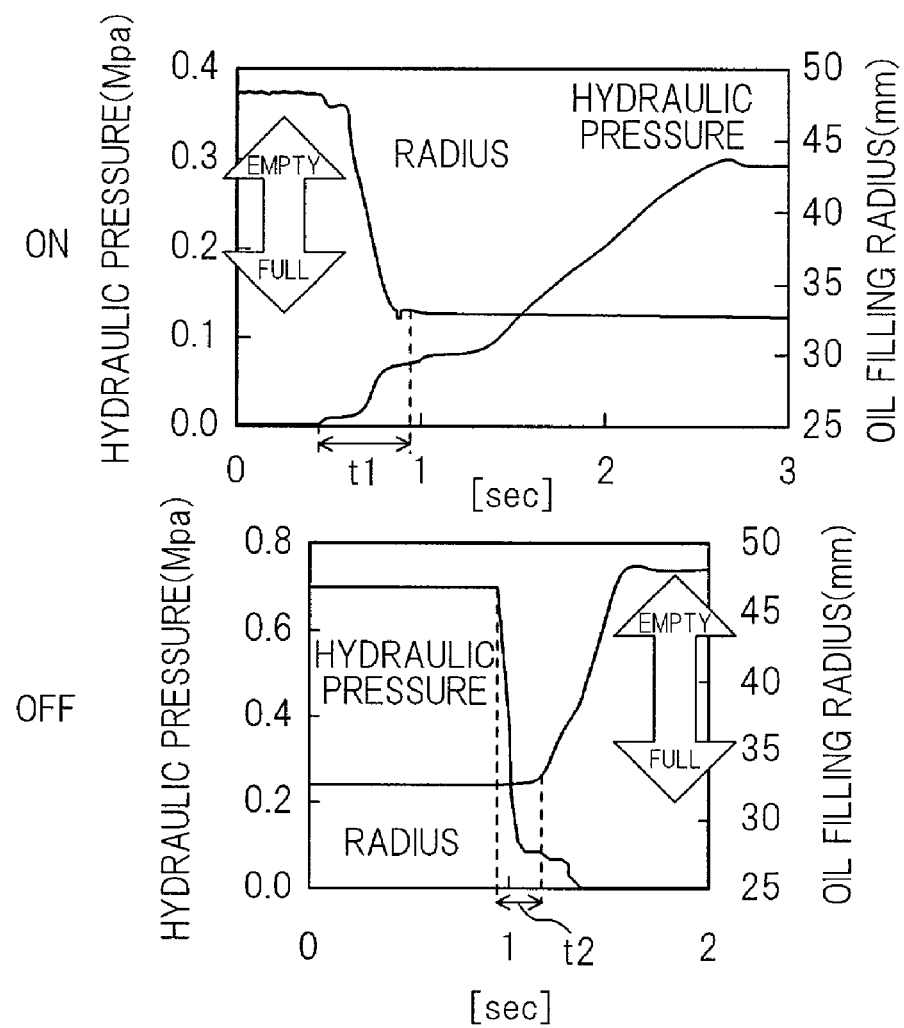
FIG. 12 is a set of graphs showing the results of measurement of the amount of fluid (oil) in a clearance of a clutch to be used for determining a transfer functions of a simplified hydraulic model referred to in the flow chart of FIG. 6.
Figure 13:
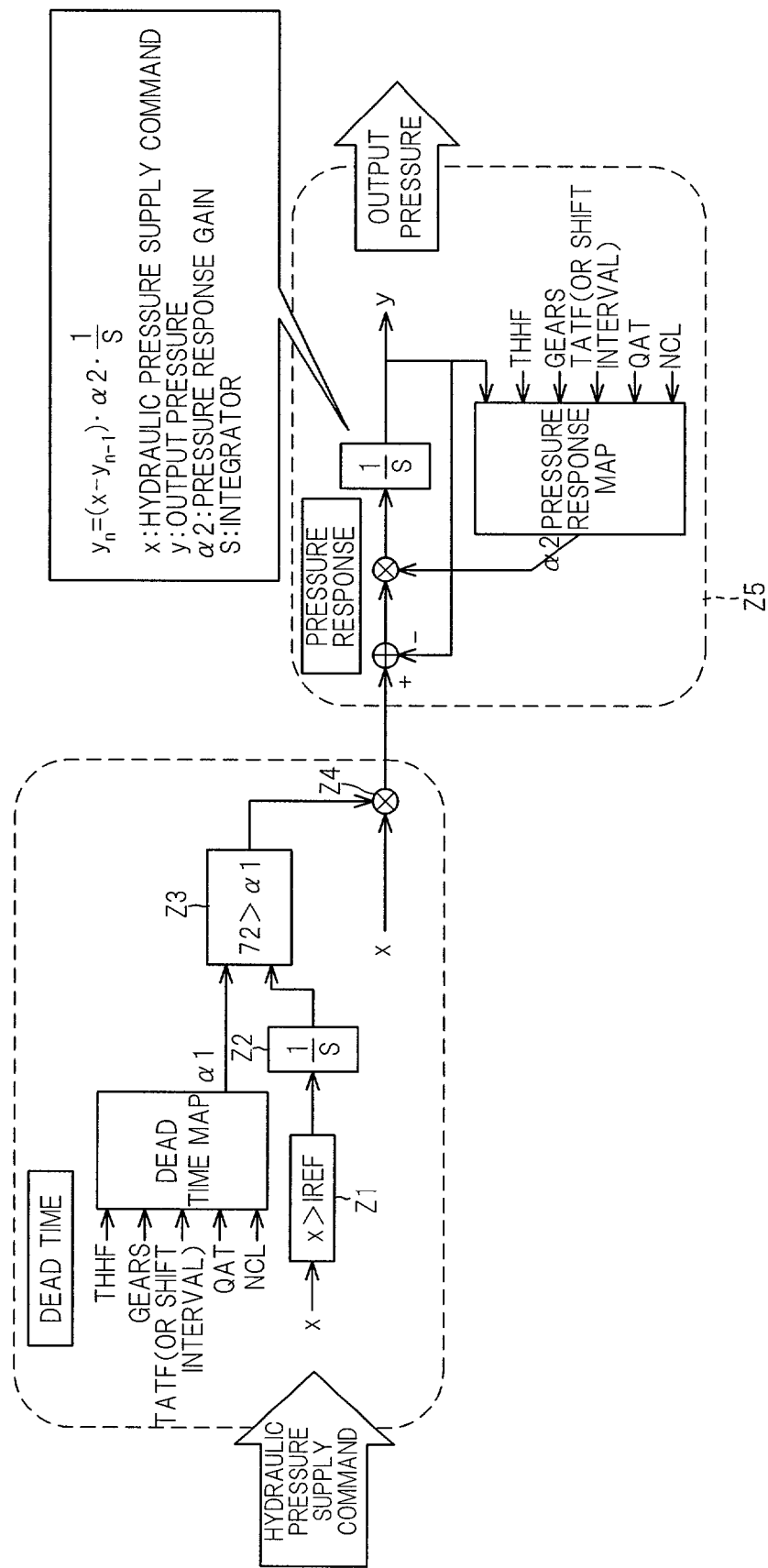
FIG. 13 is a block diagram showing the simplified hydraulic model referred to in the flow chart of FIG. 6.

In view of this problem, this embodiment is configured such that the amount of fluid (oil) in the clutch dead volume is actually measured. FIG. 12 illustrates the results of the measurement at clutch engaging and disengaging. The figure shows the results of measurement when the clutch speed NCL is 2000 rpm. This embodiment is further configured such that, based on the results of measurement, the simplified hydraulic model (which describes the behavior of the clutch 20) is designed or constructed, as illustrated in FIG. 13.

In other words, the results of measurement illustrated in FIG. 12 are utilized as the backup data of the simplified hydraulic model. In FIG. 12, the portion around 32.5 mm in the oil-filling-radius (right side) corresponding to around 0.13 Mpa in the hydraulic (oil) pressure in engagement (left side), indicates the condition where the clearance is filled with fluid (oil). The transfer function is determined based on a period of time starting at a time when fluid (oil) begins ON (rising) and ending at a time when the clearance is filled. In FIG. 12, the bottom illustrates the result of measurement when the clutch 20 is disengaged or relieved, "t2" indicates a period of time staring at a time when fluid begins dropping and ending at a time when the clearance becomes empty.

Figure 14:
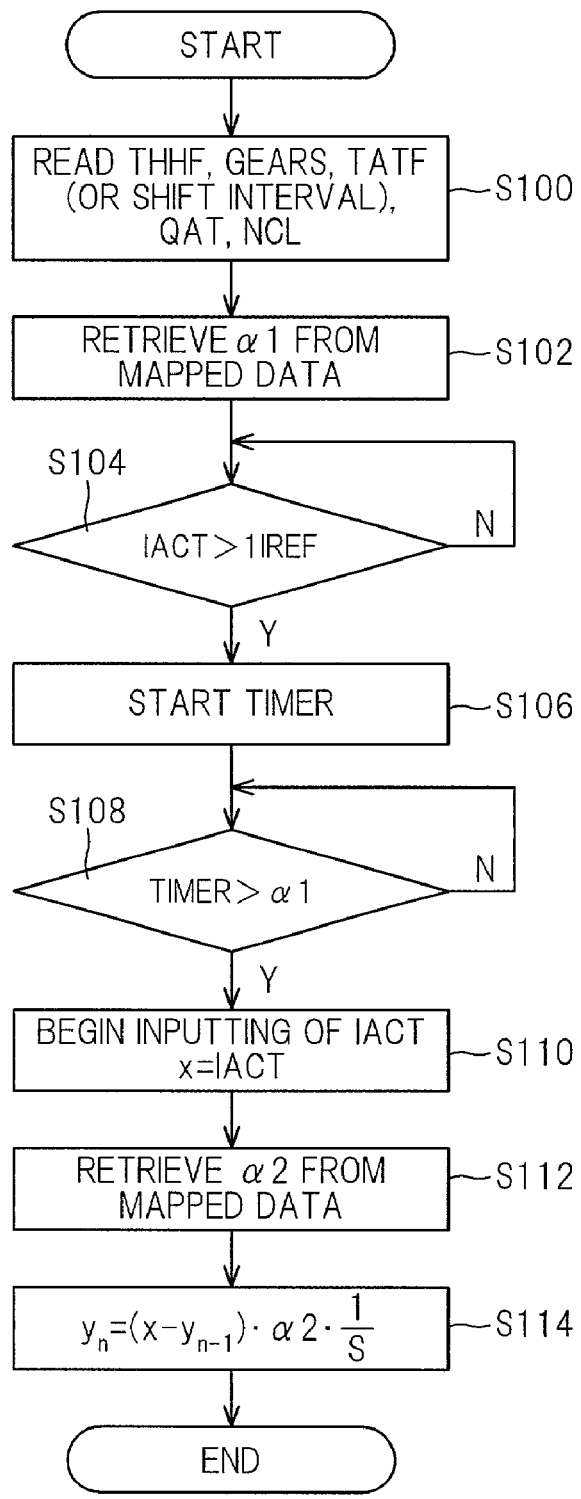
FIG. 14 is a flow chart showing the subroutine for determining the transfer functions referred to in the flow chart of FIG. 6.

FIG. 14 is a flow chart showing the subroutine for determining the transfer functions.

The program begins in S100 in which the detected throttle opining THHF, the gears shifted and shifted to, the ATF temperature TATF (or shift interval), the hydraulic pressure supply command QAT and the clutch speed NCL are read. The shift interval is calculated from an interval between the last and current shift signals. Instead of the hydraulic pressure supply command QAT, the current supply command IACT may be used.

Figure 15A:
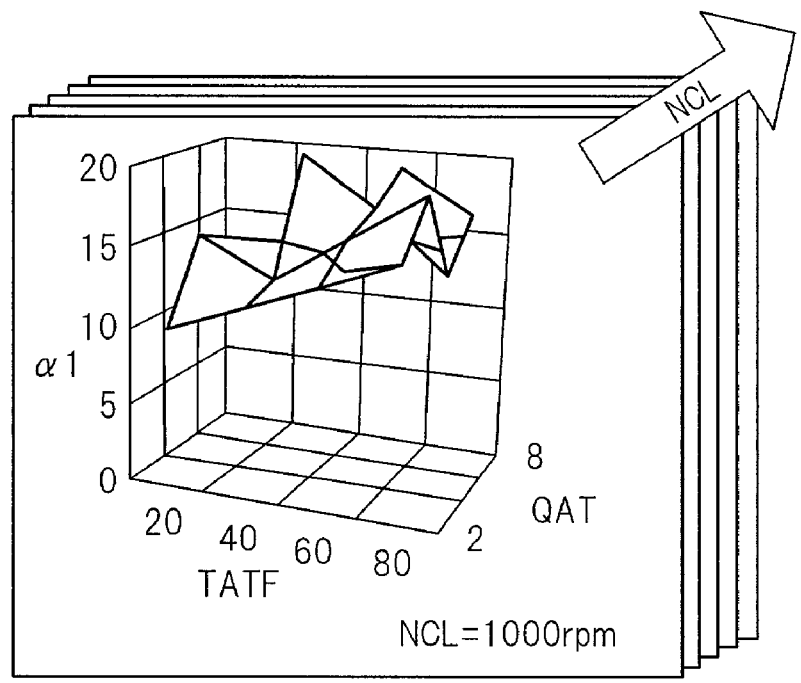
FIGS. 15A and 15B are a set of graphs showing the characteristics of mapped data of the transfer function referred to in the flow chart of FIG. 14.
Figure 15B:
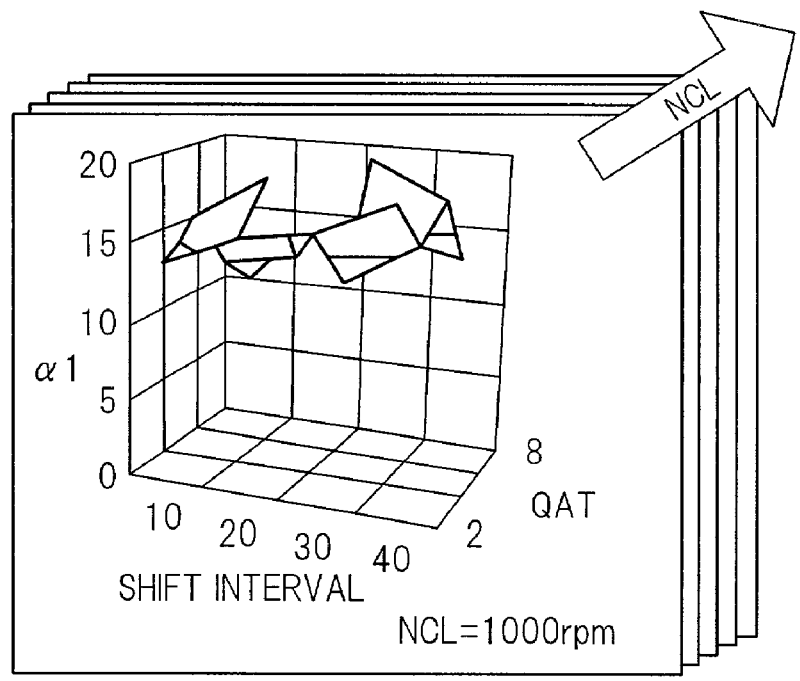

The program then proceeds to S102 in which the predetermined period of time α1 is retrieved from mapped data using these parameters as address data. FIG. 15A is a graph showing characteristics of the mapped data. Specifically, as illustrated in FIG. 15A, the time α1 is set or determined separately for clutch speeds (e.g., every 1000 rpm) NCL with respect to the ATF temperature TATF and the hydraulic pressure supply command QAT. The shift interval (some similar factors) may instead be used as illustrated in FIG. 15B. As mentioned above, the time α1 corresponds to a time necessary for play-removing clutch piston stroke and is obtained by measuring the amount of fluid (oil) in the dead volume of the clutch 20.

The program then proceeds to S104 in which it is determined whether the current supply command IACT is greater than a predetermined value IREF. The predetermined value IREF is a value set to be corresponding to the preset load of a return spring of the clutch 20 (e.g., 1 kgf/cm$^2$).

The program then proceeds to S106 in which a timer (up-counter) is started to count up and to measure time lapse, to S108 in which it is determined whether the value of the timer is greater than the time α1. When the result is negative, the program is looped until the result becomes affirmative and if it does, the program proceeds to S110 in which the inputting of the current command value IACT is begun.

The program then proceeds to S112 in which the gain (hydraulic response gain) α2 is retrieved from mapped data using the parameters referred to in S100 as address data.

Figure 16A:
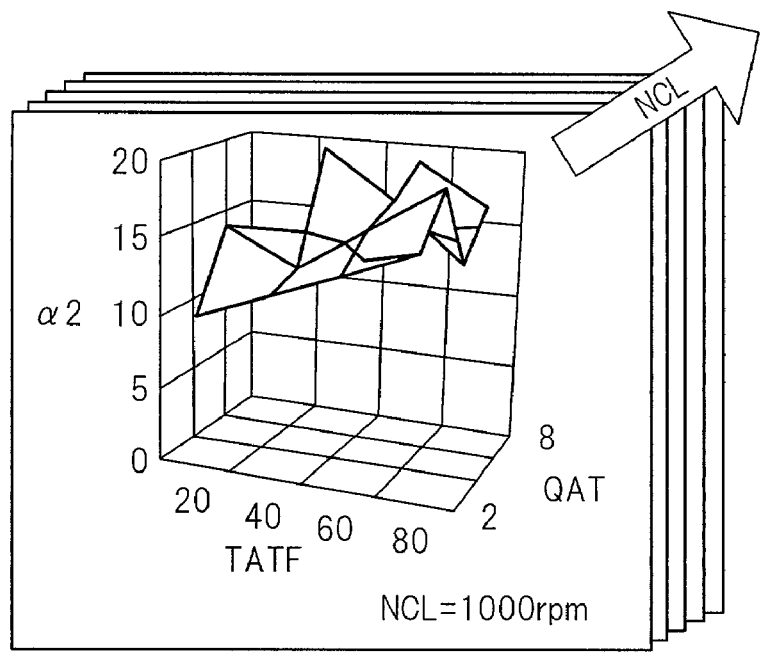
FIGS. 16A and 16B are a set of graphs showing the characteristics of mapped data of the transfer function referred to in the flow chart of FIG. 14.
Figure 16B:
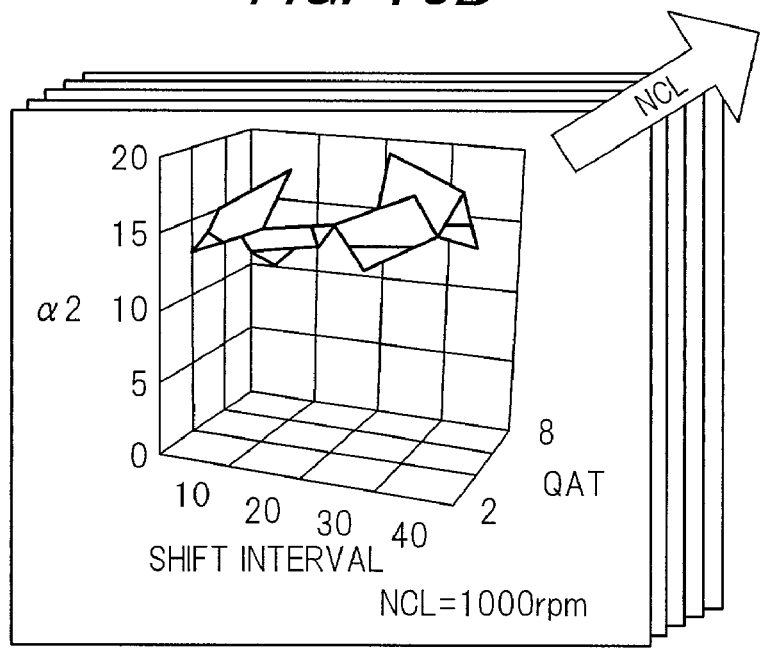

FIG. 16A is a graph showing characteristics of the mapped data. Specifically, as illustrated in FIG. 16A, the gain α2 is similarly set or determined separately for clutch speeds (every 1000 rpm) NCL with respect to the ATF temperature TATF and the hydraulic pressure supply command QAT. The shift interval (some similar factors) may instead be used as illustrated in FIG. 16B.

The program then proceeds to S114 in which the output y (output (hydraulic) pressure) is calculated using the gain α2 in accordance with an equation illustrated there.

The processing of the flow chart of FIG. 14 will be explained with reference to FIG. 13.

Figure 17:
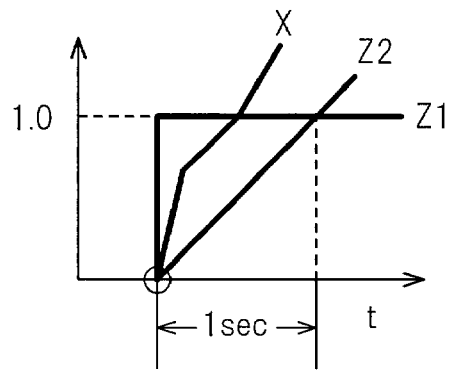
FIG. 17 is a time chart showing the configuration of a block illustrated in FIG. 13.

The input x (current command IACT) is sent to a block Z1 where the input x is compared with the predetermined value IREF. FIG. 17 is a graph showing the configuration of the block Z1. As illustrated, it is configured to output 1 when the input x exceeds the predetermined value. The output of the block Z1 is then sent to a block Z2 where the value is subjected to integration. The block Z2 is a time integrator (corresponding to the aforesaid timer) which outputs 1 for 1 sec.

Figure 18:
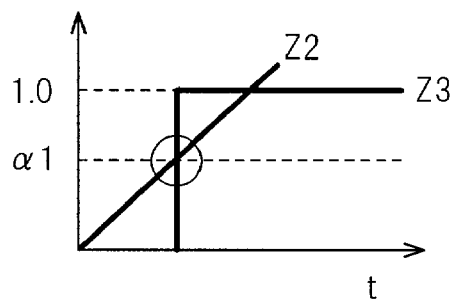
FIG. 18 is a time chart showing the configuration of a block illustrated in FIG. 13.

The output of the block Z2 is sent to a block Z3 where it is compared with the predetermined time α1. FIG. 18 is a graph showing the configuration of the block Z3. As illustrated, it is configured to output 0 until the output of the block Z2 exceeds the predetermined time α1, but outputs 1 when the output of the block Z2 exceeds the predetermined time α1. The output of the block Z3 is sent to a multiplier Z4 where it is multiplied by the input x.

Figure 19:
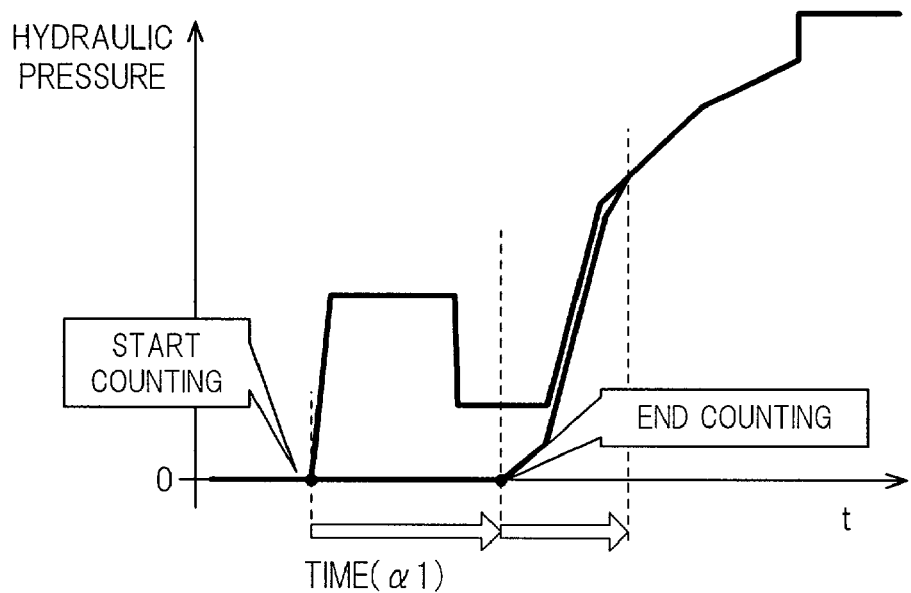
FIG. 19 is a time chart showing the configuration of a block illustrated in FIG. 13.

With this, as illustrated in FIG. 19, the output of the multiplier Z4 is kept 0 until the predetermined time α1 has passed. And if it does, the multiplier Z4 outputs the input x immediately. The output of the multiplier Z4 is sent to a gain regulator Z5 where the output y is calculated with the use of the gain α2 and the equation (illustrated in S114).

As will be understood from the equation, the output y is determined such that the difference between the input x and the output y decreases. In other words, the, transfer function α2 of the simplified hydraulic model is determined such that the output (output pressure) y converges to the estimated effective clutch pressure PCL.

Figure 20:
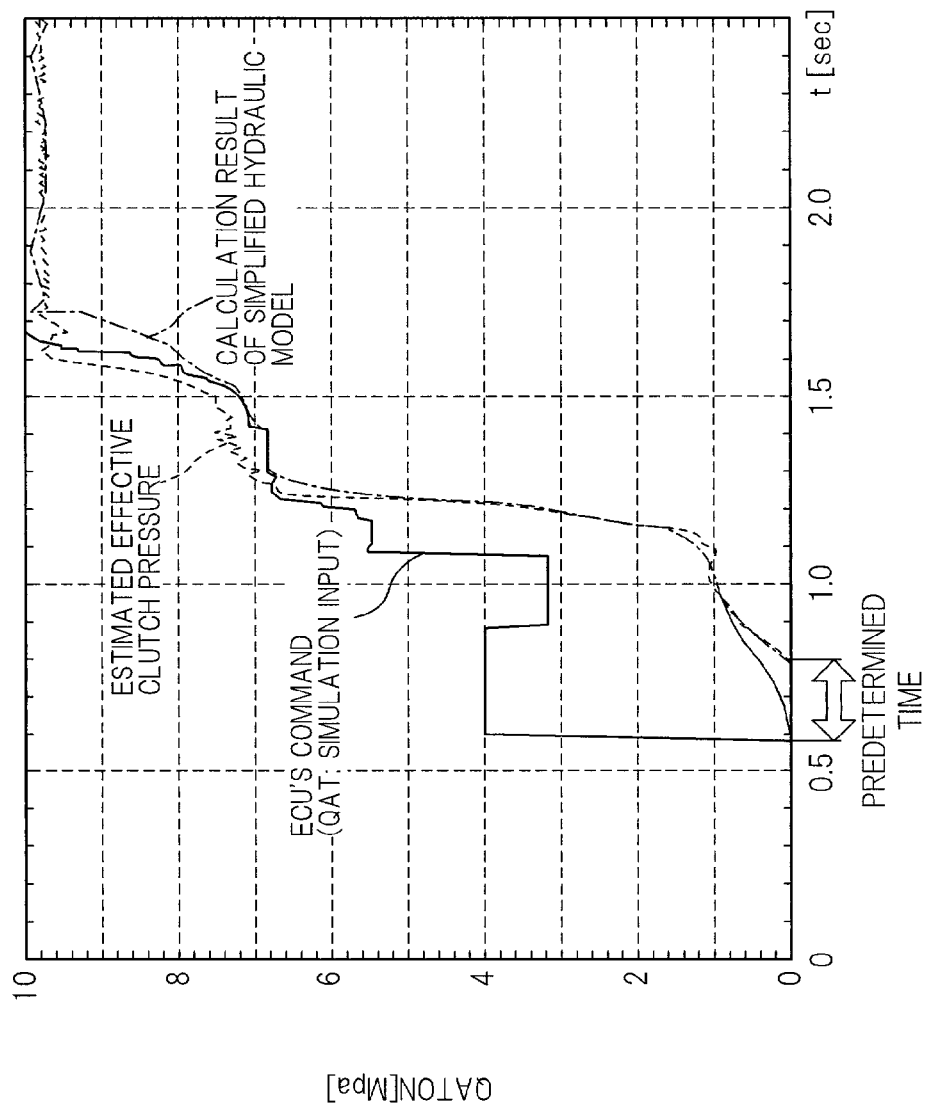
FIG. 20 is a graph showing the result of processing mentioned with reference to FIGS. 13 and 14.

FIG. 20 is a graph showing the result of processing mentioned with reference to FIGS. 13 and 14. The illustrated is an example where the gears are shifted from 1st to 2nd and the throttle opening is ⅖ (where, 8 indicates the fully-opened state).

In the figure, "CALCULATION RESULT OF SIMPLIFIED HYDRAULIC MODEL" indicates the output y obtained with the use of the simplified hydraulic model. And "ESTIMATED EFFECTIVE CLUTCH PRESSURE" is the aforesaid clutch pressure estimated from the measured hydraulic pressure and driveshaft torque TDS, using the same input IACT. From the figure, it will be understood that the output (output hydraulic pressure) y is almost equal to the estimated effective clutch pressure PCL.

Figure 21:
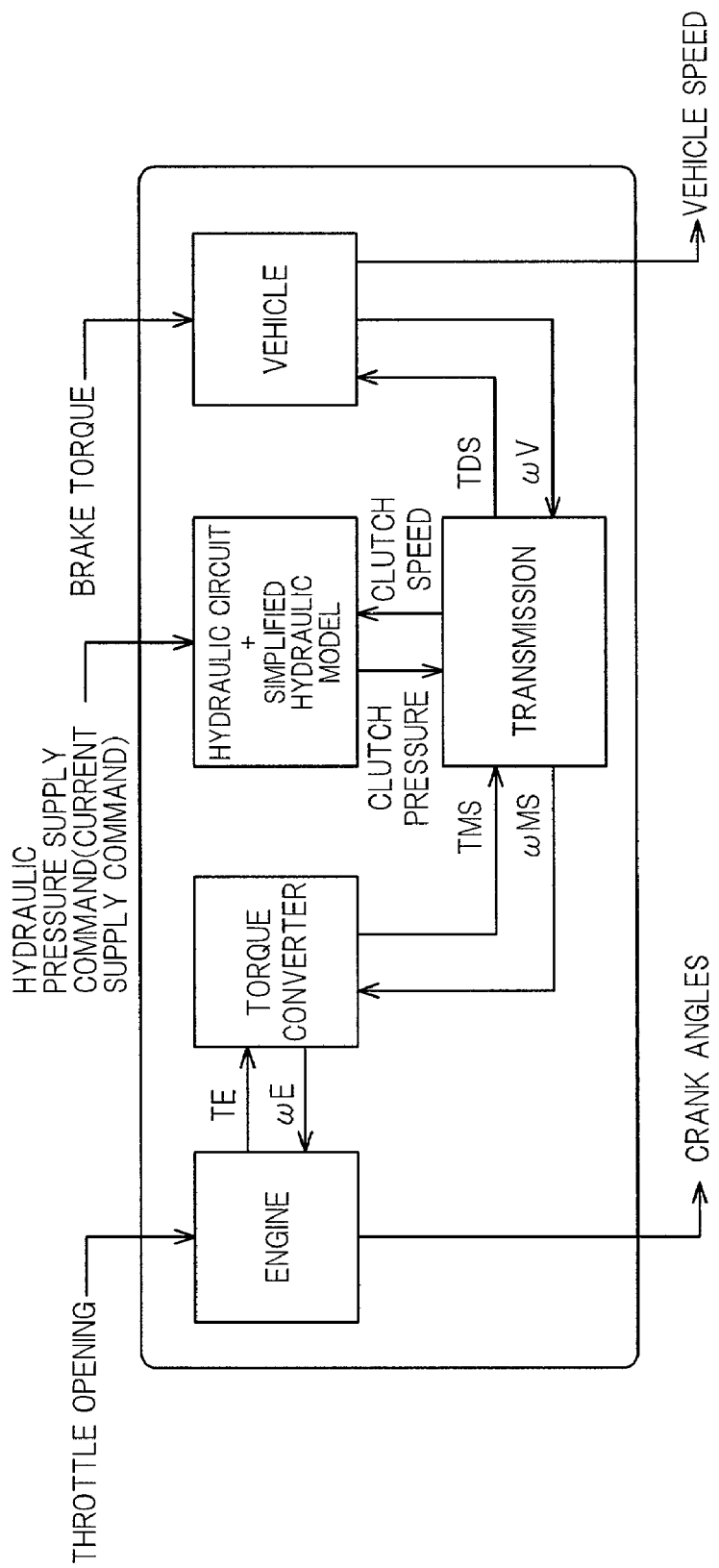
FIG. 21 is a view, similar to FIG. 9, but showing the configuration of the real-time shift simulation model referred to in the flow chart of FIG. 6.

Returning to the explanation of the flow chart of FIG. 6, the program then proceeds to S18 in which a real-time shift simulation model (third model) is designed or constructed by incorporating the simplified hydraulic model in the shift simulation model. Specifically, this is done by incorporating the simplified hydraulic model illustrated in FIG. 13 with the model illustrated in FIG. 9. FIG. 21 is a block diagram showing the configuration of the real-time shift simulation model.

In the flow chart of FIG. 6, the program then proceeds to S20 in which real-time simulation is conducted in the configuration constituted by the second simulator section 40a and the input/output interface 42 (i.e. HILS shown in FIG. 1), using the real-time shift simulation model, and the shift control algorithm stored in the ECU 12 is analyzed or evaluated to determine whether the shift shock occurs.

Since the details of the real-time simulation were described in the aforesaid earlier application proposed by the assignee, no further explanation will be made. In the configuration described in the earlier application, the transmission model was divided into a clutch section and others. The calculation (sampling time) of the clutch section was executed once every 20 μsec., while that of the rest including the other the transmission model and other model (such as an engine model) was executed once every 200 μsec., such that real-time simulation was realized with the sampling time of 20 μsec.

In the configuration of this embodiment according to the invention, by using of the simplified hydraulic model, the inventors have noted that it took only 4 sec. to simulate one shift (in a real world which usually needs approximately 1.5 sec.) in the simulation referred to in S20. When the same simulation was conducted on the same computer using the model described in the prior art, it took 120 sec. Thus, the simulation time is thus decreased to ⅟30 and is thus be markedly shortened. In other words, it now becomes possible to conduct simulation in a time close to the time of actual shift.

Figure 22:
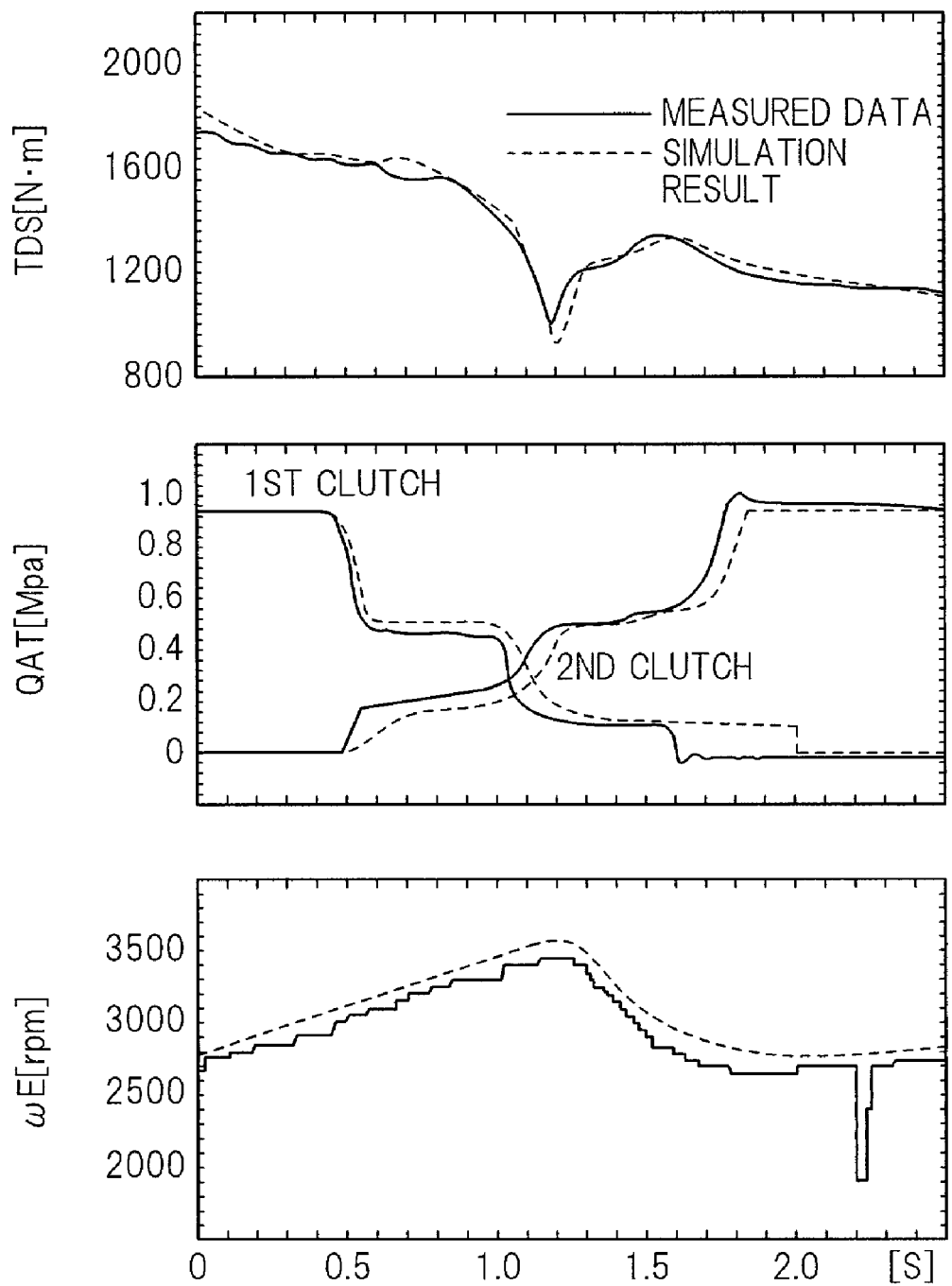
FIG. 22 is a set of graphs showing the result of real-time shift simulation referred to in the flow chart of FIG. 6.

FIG. 22 is a set of graphs showing the result of this real-time shift simulation. In the figure, "SIMULATION RESULT" indicates the result of this simulation and "MEASURED DATA" indicates measured values gathered on an actual shift control (in a real world) conducted by the same ECU 32 (which is the same one as used in the simulation). As will be seen from the graphs, the real-tome simulation conducted in this embodiment exhibits almost same results obtained in the actual shift control.

Having been configured in the foregoing manner, in a simulator for automatic vehicle transmission controllers according to th is embodiment, the simplified hydraulic (second model) describing the behavior of the clutch whose operation is not linear, is designed and determines its transfer functions such that the input x (IACT corresponding to QAT) is immediately sent to the gain regulator Z5 when the time (timer value) during which the input x exceeds the predetermined value, is greater than the predetermined time α1, and in the gain regulator Z5, the gain α2 is determined in such a manner that the difference between the input x and the output y decreases, in other words, the gain α2 is determined such that the output (output pressure) y converges the estimated effective clutch pressure PCL.

With this, by using such a simplified model, it becomes possible to decrease simulation time to 4 sec. or thereabout, enabling to simulation in a time close to an actual shift of approximately 1.5 sec. In particular, since the output calculation in the second simulator section 40a is not necessary for the predetermined time α1, this can decrease the calculation load of the second simulator section 40a and contributes greatly in the reduction of simulation time.

Furthermore, the simulator in this embodiment is configured such that the transfer functions α1, α2 are obtained by retrieving the mapped data by the predetermined parameter. With this, when the simulator is to be used on different transmissions, it suffices if the amount of fluid (oil) in the clearance is measured and the predetermined parameters are corrected in response to the results of measurement.

Thus, the simulator for a controller of an automatic vehicle transmissions according to this embodiment is improved in terms of general-purpose and can simulate shift algorithm stored in the controllers in a constant time for different clutches.

Figure 23:
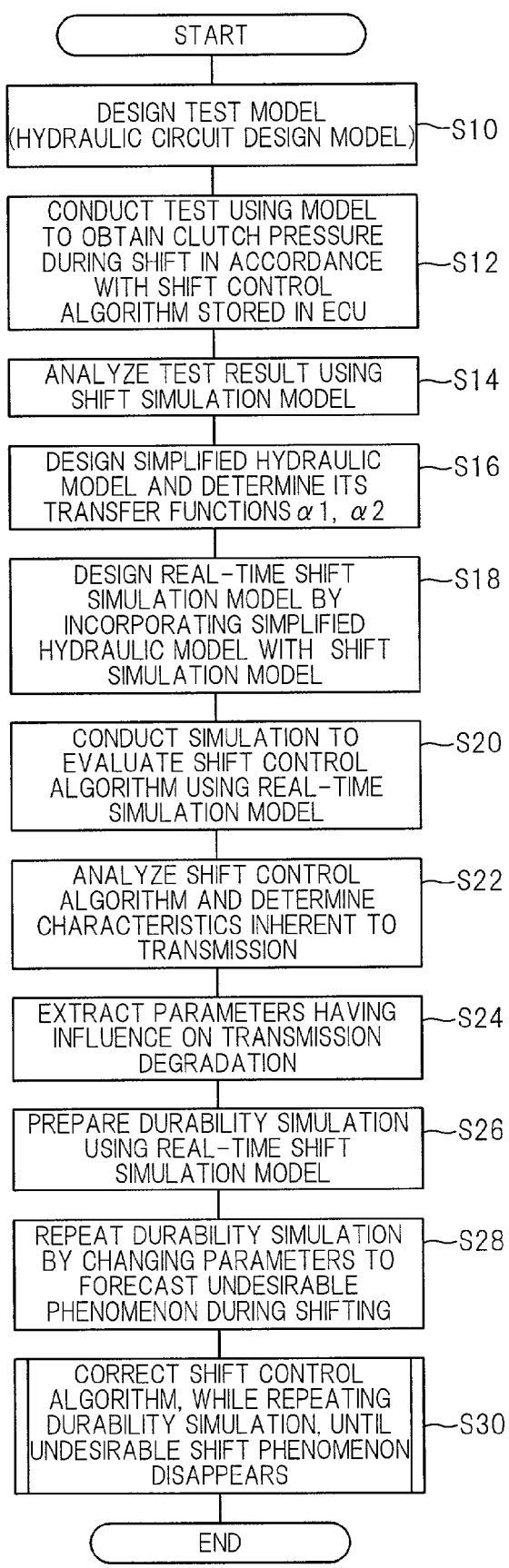
FIG. 23 is a view, similar to FIG. 6, but showing the operation of a simulator for automatic vehicle transmission controllers according to a second embodiment of the invention.

FIG. 23 is a view, similar to FIG. 6, but showing the operation of a simulator for automatic vehicle transmission controllers according to a second embodiment of the invention.

Explaining the flow chart, the program begins in S10 and proceeds up to S20 in the same manner as that of the first embodiment, proceeds to S22 in which the shift control algorithm is analyzed and characteristics or values inherent to the transmission T (and the engine E) are determined.

Specifically, the second embodiment aims to conduct durability testing using the real-time shift simulation model used in the first embodiment to evaluate the quality of the automatic transmission (product) T.

The correlation of the durability testing and the shift control simulation will be explained.

Figure 24:
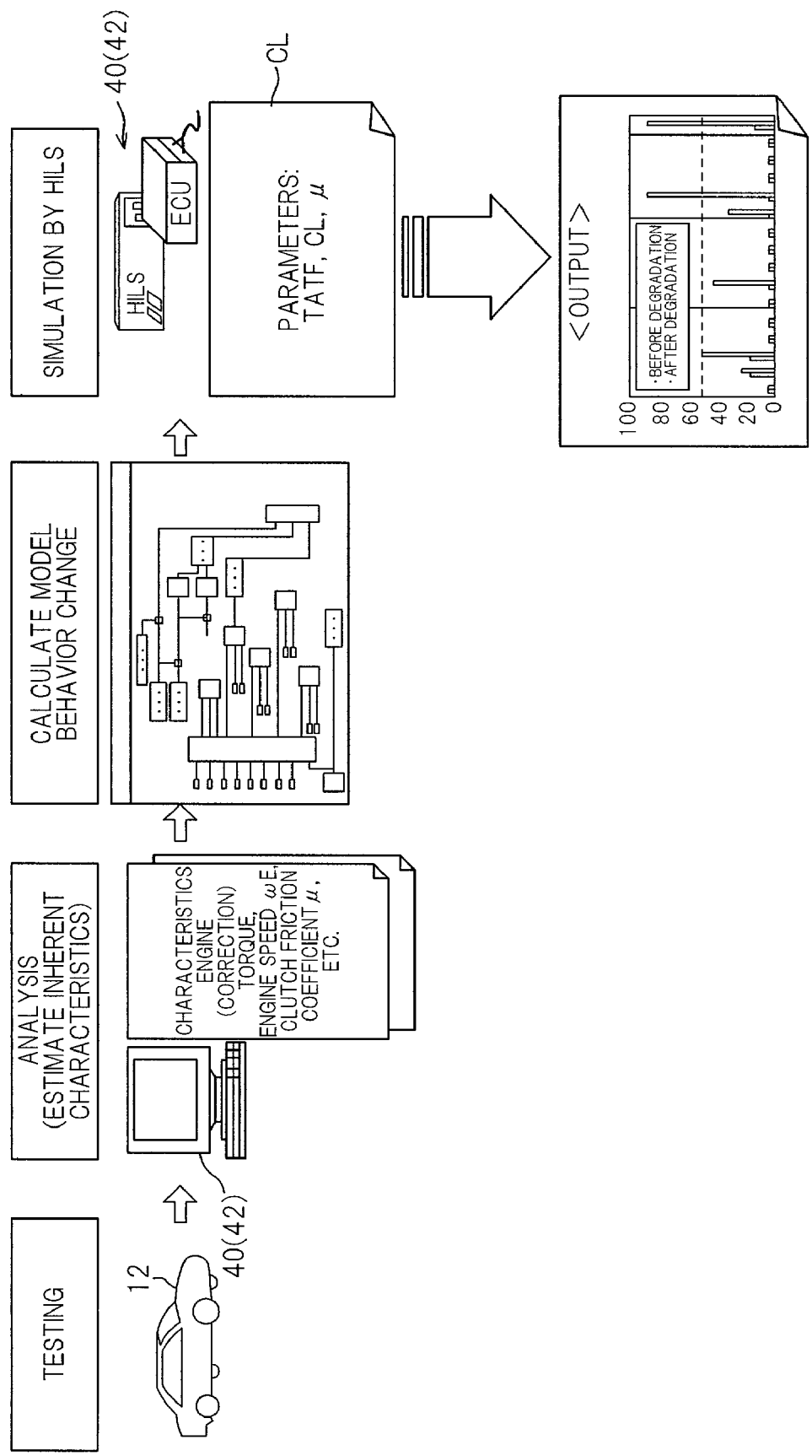
FIG. 24 is a block diagram showing the correlation of durability testing and the real-time simulation referred to in the flow chart of FIG. 23.
Figure 25:
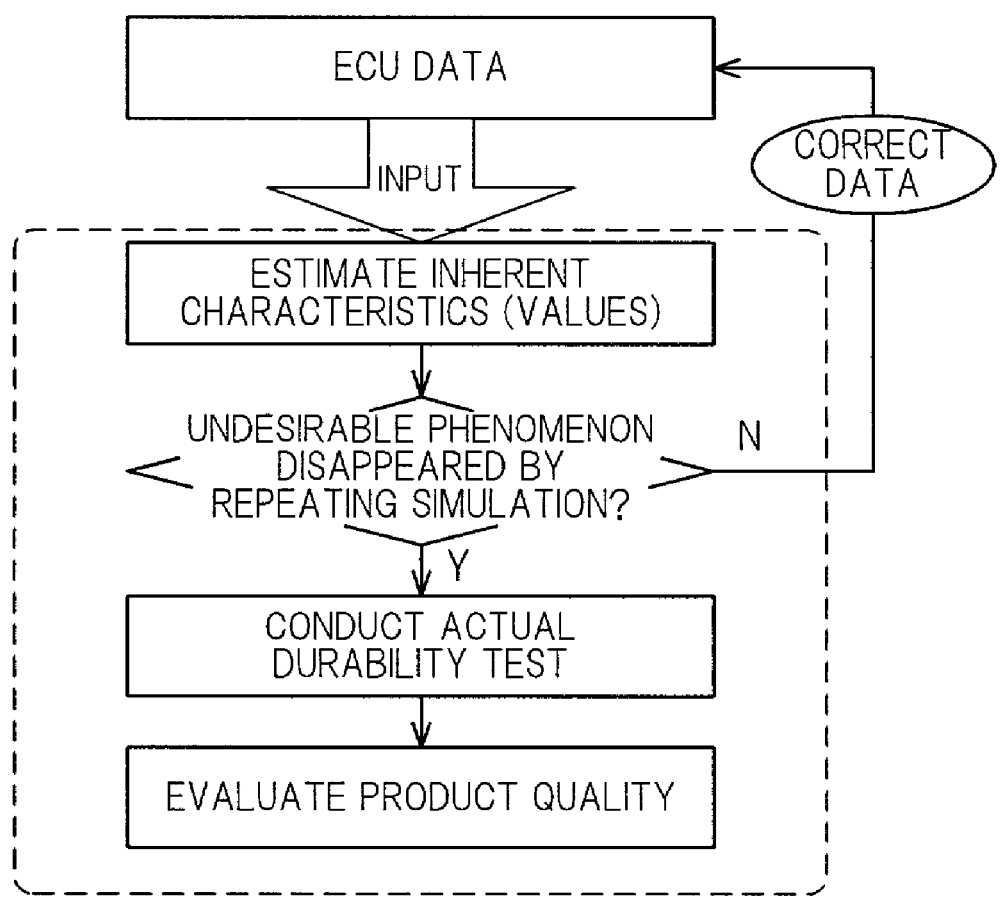
FIG. 25 is a flow chart similarly showing the correlation of durability testing and the real-time simulation referred to in the flow chart of FIG. 23.

FIG. 24 is a block diagram showing the correlation of the durability testing and the real-time simulation and FIG. 25 is a flow chart showing the same.

Briefly explaining this, the behavior of the shift control algorithm stored in the ECU 32 mounted on the vehicle 12 is simulated offline by the second simulator section 40a, and the characteristics inherent to the transmission T (and the engine E) are determined or estimated.

Then, parameters (durability degradation factors) which would influence on the determined characteristics when the durability of the transmission T is degraded, are extracted. Then, the durability simulation is repeated using the real-time shift simulation model, while changing the extracted parameters, and the occurrence of any undesirable phenomenon is forecast or predicted. The result of forecast is demonstrated on the display of the second simulator section 40a.

Then, the durability simulation is continuously repeated, while correcting the data (constituting the shift control algorithm) stored in the ROM of the ECU 32, until the forecast undesirable phenomenon disappears. Finally, actual durability testing (i.e., the bench test conducted by connecting it to the actual engine E) is conducted to evaluate the quality of the transmission T and the shift control algorithm.

Returning to the flow chart of FIG. 23, this will be explained.

As mentioned above, in S22, the shift control algorithm is analyzed and characteristics inherent to the transmission T are determined.

Specifically, the second simulator section 40a is connected to the ECU 32 through the input/output interface 42 to input the shift control algorithm. The second simulator section 40a analyzes the inputted shift control algorithm and based on the analysis, it then analyzes or determines the characteristics of the transmission T (and the engine E) during shift is made in accordance with the shift control algorithm. What are analyzed or determine are, as illustrated in FIG. 24, the engine (correction) torque, the engine speed $\omega E$, clutch friction characteristic (clutch frictional coefficient $\mu$), the operating conditions of the ECU 32, etc. The second simulator section 40a analyzes these parameters of the transmission T (test piece) and determines or analyzes characteristics or values inherent to it, i.e., it determines or analyzes inherent or initial values (due to manufacturing variance).

FIGS. 26A to 26C are views showing the result of the determination or analysis. FIG. 26A is a chart showing an example of the result of analysis of the test piece obtained separately for kinds of shift (such as upshifting from 1st to 3rd) and the throttle opening THHF. FIG. 26B is a graph showing the friction characteristic (frictional coefficient $\mu$) inherent to the clutch 20 determined from the result of analysis illustrated in FIG. 26A, and FIG. 26C is a graph similarly showing the characteristic of (correction) torque inherent to the engine E determined from the result of analysis illustrated in FIG. 26A. As illustrated in the figures, each deviation (due to manufacturing variance) from the median (standard value) is determined as the characteristics or values inherent to the test piece.

Returning to the explanation of the flow chart of FIG. 23, the program then proceeds to S24 in which the aforesaid parameters having influence on the degradation of the transmission T are extracted. The parameters are the ATF temperature TATF, the clearance CL of the clutch 20, and the friction coefficient $\mu$ of the clutch 20.

The program then proceeds to S26 in which the preparation of the durability simulation using the real-time shift simulation model implemented on the system including the second simulator section 40a (illustrated in FIG. 1) is conducted.

The program then proceeds to S28 in which the durability simulation is repeated, while changing the parameters (durability degradation factors), and obtains or calculates the behavior change of the model (the real-time shift simulation model illustrated in FIG. 21) describing the behavior of the vehicle 12, the engine E and the transmission T, in other words, conducts modeling of the real-time simulation model (i.e., correlation of the simulation model) to forecast or predict a undesirable phenomenon during shift from the behavior change of the model.

Specifically, the TATF temperature TATF is changed from −30° C. to +140° C., the clutch clearance CL is changed by a prescribed amount from the median (standard value corresponding to that of a new one) in an increasing direction (i.e., in the direction in which the degradation is increased), and the clutch friction coefficient $\mu$ is changed by a prescribed amount from the median (standard value corresponding to that of a new one) in a decreasing direction (i.e., the degradation is increased). Then, the behavior change which would occur in the model (illustrated in FIG. 21) in response to these changes of the parameters, is calculated.

More specifically, the model behavior change is calculated, when TATF is −30° C., while CL and $\mu$ are fixed at their medians. Then, the model behavior change is calculated, when TATF is −29° C., while CL and $\mu$ are still fixed at their medians. In this way, the model behavior change is successively calculated when TATF is changed by 1° C., while the other two parameters are kept unchanged.

Next, the model behavior change is calculated, when CL is changed by the prescribed in the increasing direction, while TAFT is set to −30° C. and $\mu$ is set to its median, and is successively calculated, when CL is continued to be changed by the prescribed amount in the increasing direction, while the other two parameters are kept unchanged.

Next, the model behavior change is calculated, when $\mu$ is successively changed by the prescribed amount in the decreasing direction, while TAFT is set to −30° C. and CL is set to its median.

After the simulation while changing the parameters in this manner have been finished, the results of simulation are processed offline on the host computer 44, and the data of the ECU 32 is evaluated for the respective parameters. Then, based on the result of evaluation, the occurrence of undesirable shift phenomenon is forecast or predicted. Since the volume of calculation of the model behavior change due to the change of the parameters becomes huge, the calculation result of the model behavior changes is stored as a data base.

With this, it becomes possible to decrease the volume of calculation and the simulation time, if similar durability simulation is conducted on different transmissions.

Figure 27:
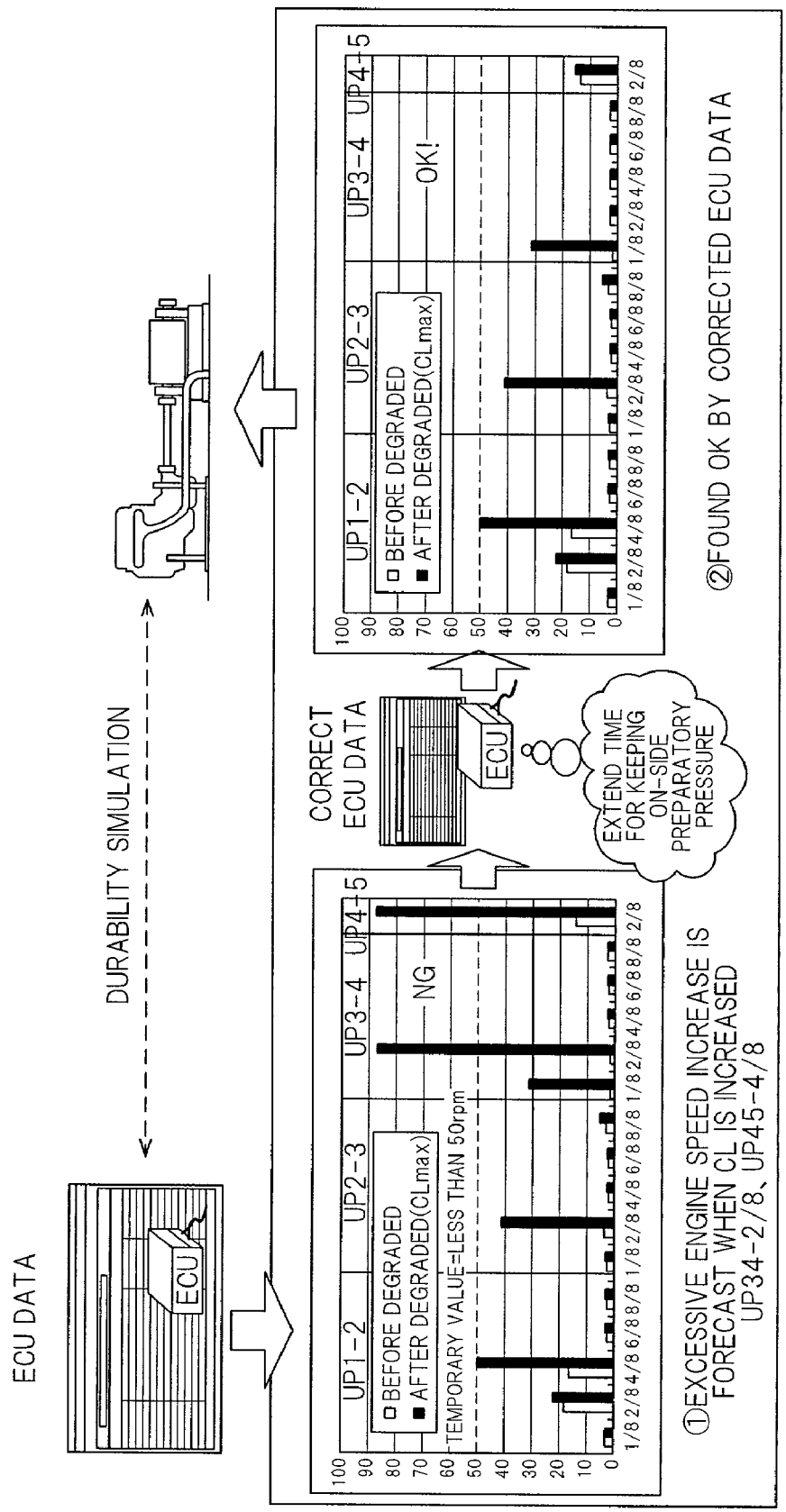
FIG. 27 is a set of graphs showing an example of the durability simulation referred to in the flow chart of FIG. 23 and schematically showing a bench test.

FIG. 27 is a graph showing an example of the durability simulation mentioned above. In the illustrated example, the clutch clearance CL was changed in the increasing direction. Here, in the simulation, the occurrence of undesirable shift phenomenon, i.e., an excessive engine speed increase was forecast in the data (shift control algorithm) of the ECU 32. Accordingly, the data of the ECU 32 was corrected and the durability simulation was repeated such that the problem was solved. Therefore, it is now possible to conduct the actual bench test (illustrated at the right top of the figure). The inventors have found that It took only 5.5 days to evaluate the shift control algorithm through the durability simulation in this manner.

The period of time for testing will be explained.

it hitherto took 20 days or thereabout to manufacture a test transmission and conduct a preliminary testing on the transmission to evaluate the quality or performance of the data (constituting the shift control algorithm) of the ECU 32. Then, the bench test was conducted continuously for several months to test the durability and evaluate the quality of the transmission and the shift control algorithm.

On the contrary, in this embodiment, since occurrence of undesirable shift phenomenon is forecast or predicted through the repeated durability simulation, the manufacturing of a test transmission and the preliminary test are no longer needed. More specifically, the period of 20 days is now shortened to 5.5 days of simulation. With this, it becomes possible to save 14 days. Thus, the efficiency of transmission development can be markedly improved and costs for evaluating the quality of product can also be decreased.

Figure 28:
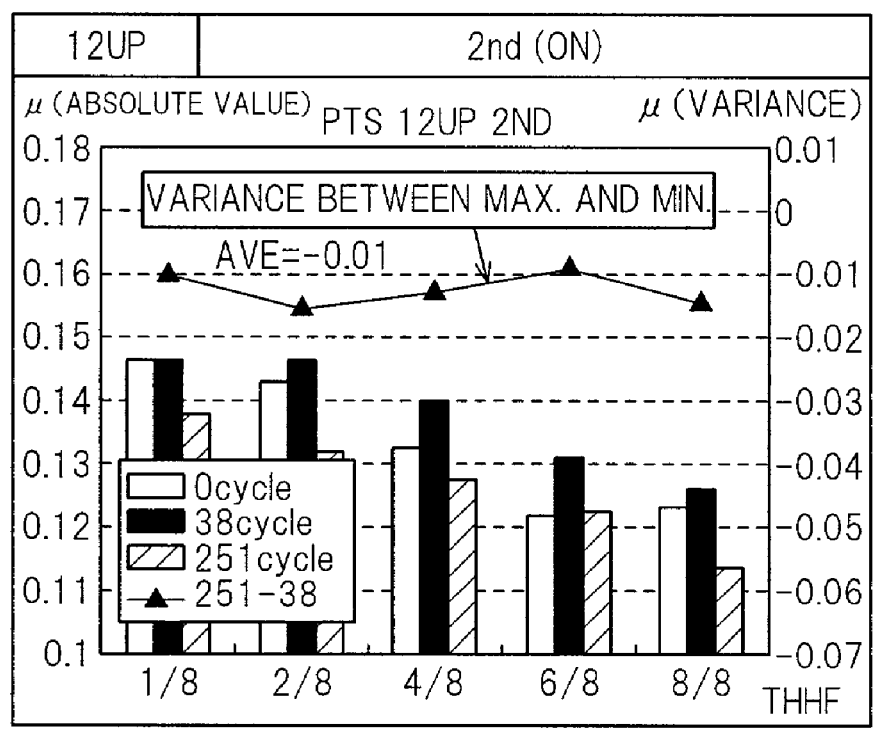
FIG. 28 is a graph sowing the result of the durability simulation referred to in the flow of FIG. 23.

FIG. 28 is a graph sowing the result of the durability simulation, more precisely, the result of processing (analyzing) of the durability simulation on the host computer 44. It exhibits the degradation of the clutch friction coefficient μ after 38/318 cycles and 251/318 cycles (where "cycle" indicates a unit of virtual running of the vehicle 12). In the illustrated data, the friction coefficient is that of the clutch for 2nd gear (ON-side) during upshifting from 1st to 2nd. The data exhibits that the degradation of 0.01 in average was found (forecast).

Figure 29:
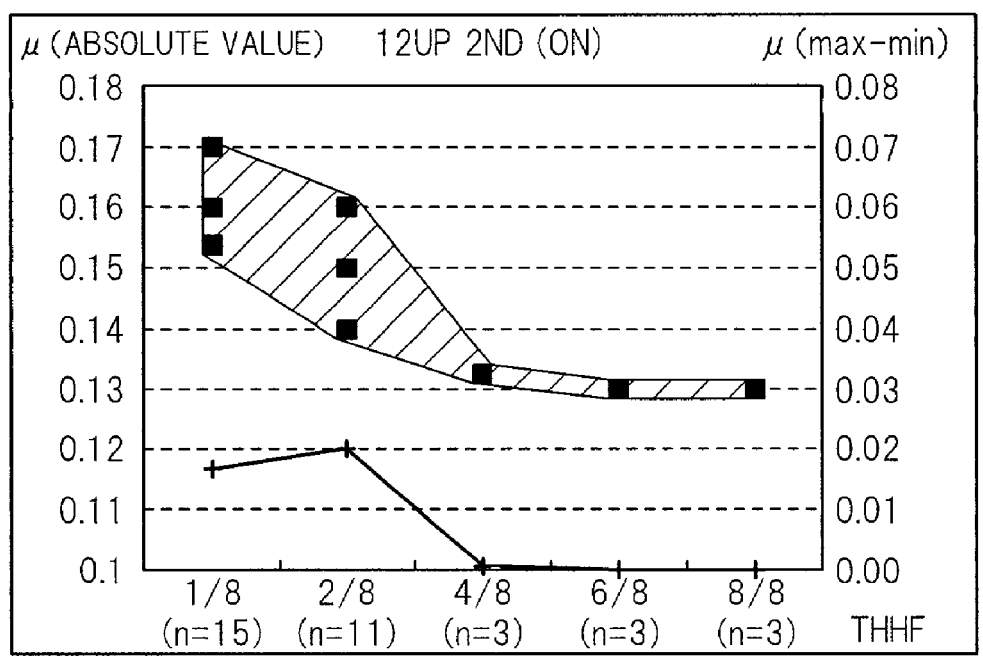
FIG. 29 is a graph sowing the result of the durability simulation referred to in the flow of FIG. 23.

FIG. 29 is a graph similarly sowing the result of the durability simulation, more precisely, the result of processing (analyzing) of the durability simulation on the host computer 44. It exhibits the degradation of the clutch friction coefficient μ for separate throttle opening THHF. The illustrated data exhibits that a variance of 0.02 in μ in the clutch for 2nd gear (ON-side) during upshifting from 1st to 2nd, was found (forecast).

Figure 30:
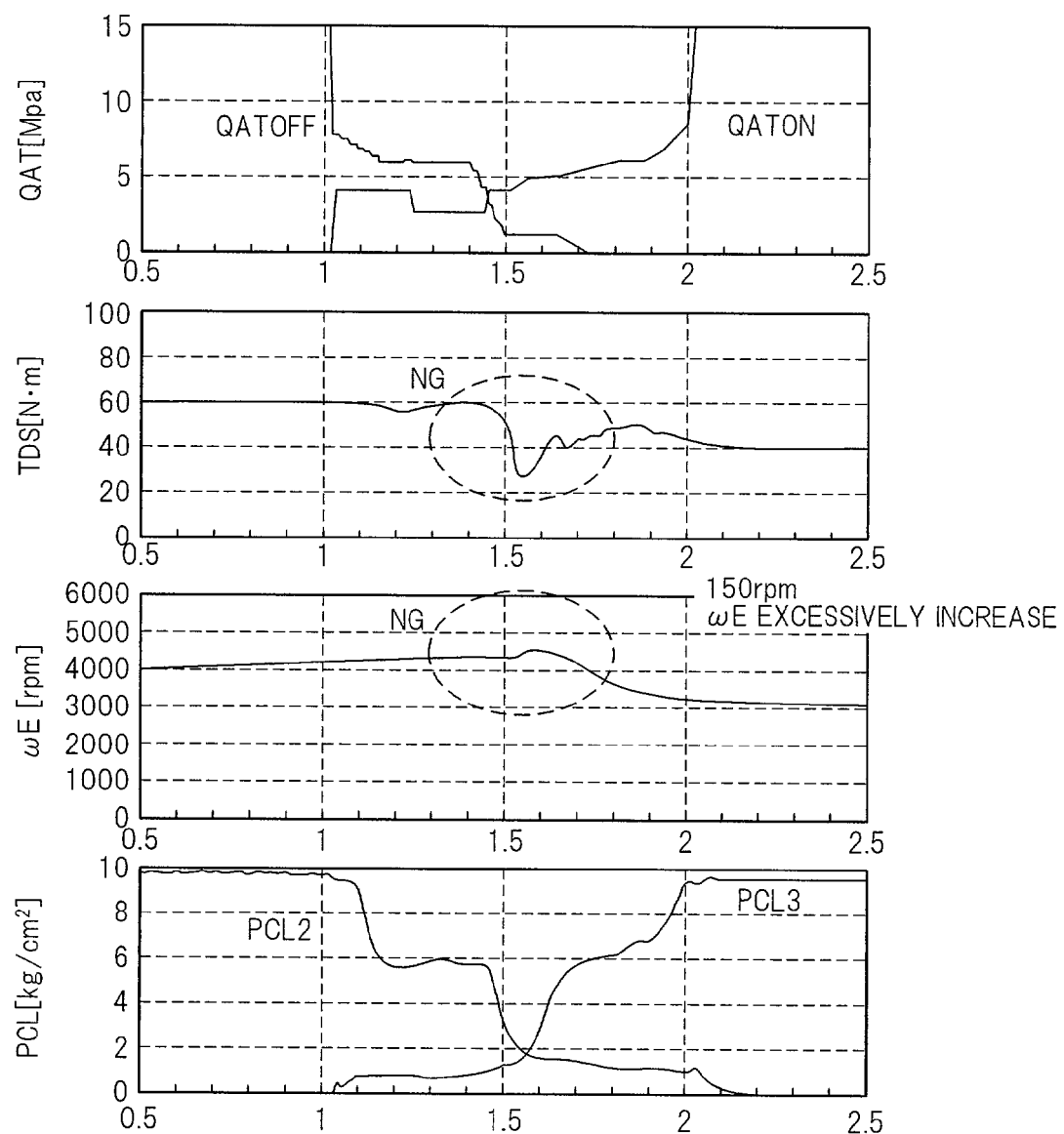
FIG. 30 is a set of graphs showing the result of durability simulation referred to in the flow chart of FIG. 23.

FIG. 30 is a set of graphs showing the result of durability simulation which was conducted on the condition mentioned with reference to FIG. 28 and exhibits the same when the clutch clearance CL is increased (degraded). As illustrated, the occurrence of excessive engine speed increase (150 rpm) was seen (forecast).

Returning to the explanation of the flow chart of FIG. 23, the program proceeds to S30 in which the durability simulation is repeated by correcting the shift control algorithm (data) stored in the ROM of the ECU 32 based on the inherent value(s) of the estimated characteristic(s) until a forecast undesirable shift phenomenon disappears.

Figure 31:
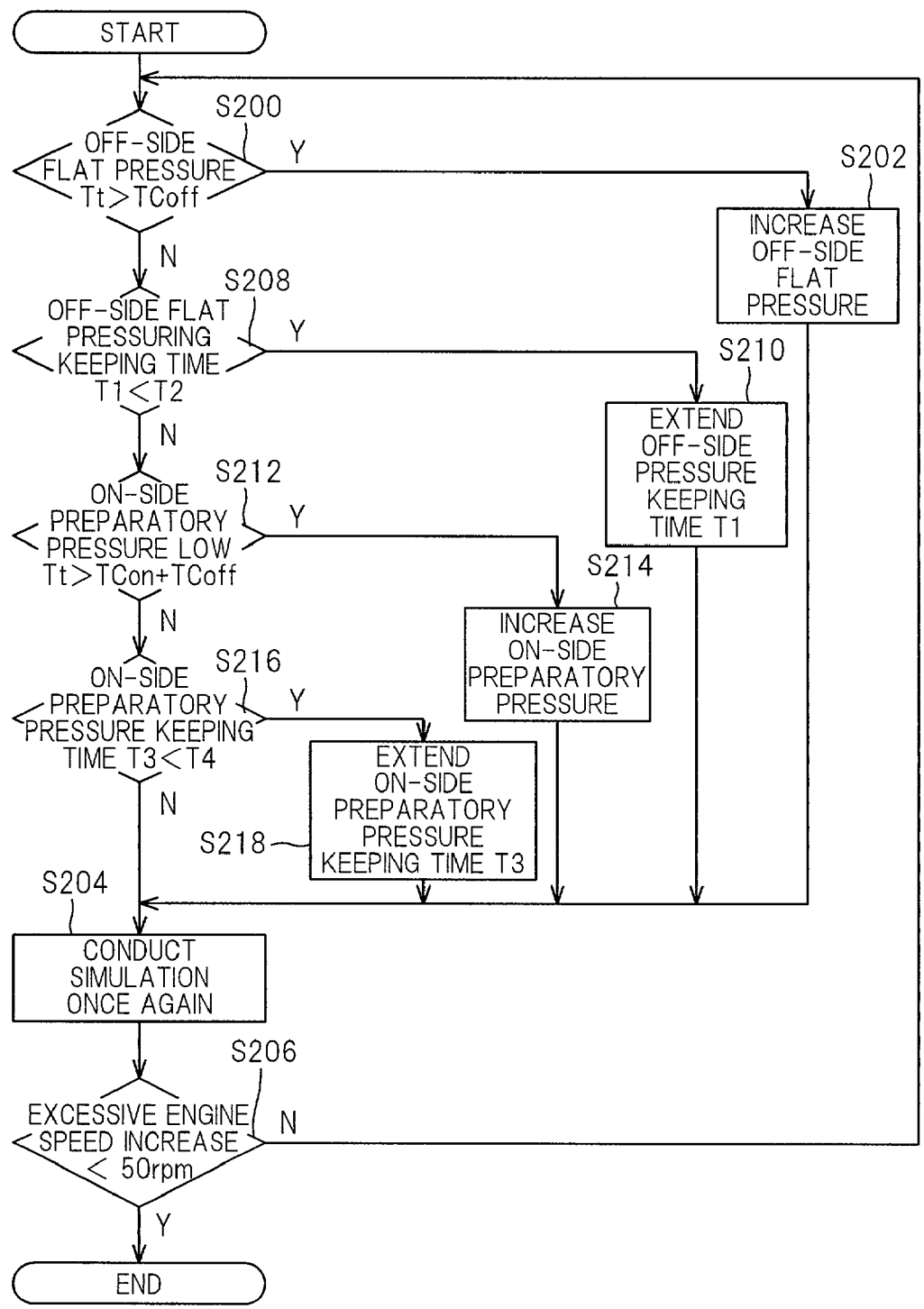
FIG. 31 is a flow chart showing the subroutine for coping with the situation when the occurrence of a undesirable shift phenomenon is forecast referred to in the flow chart of FIG. 23.

FIG. 31 is a flow showing the subroutine for coping with the situation when the occurrence of a undesirable shift phenomenon is forecast.

The processing of this flow chart will be explained taking as the example the situation where the occurrence of excessive engine speed increase such as illustrated in FIG. 30 is forecast and the shift control algorithm is corrected by adjusting the OFF-side flat pressure of the clutch 20 concerned.

Figure 32:
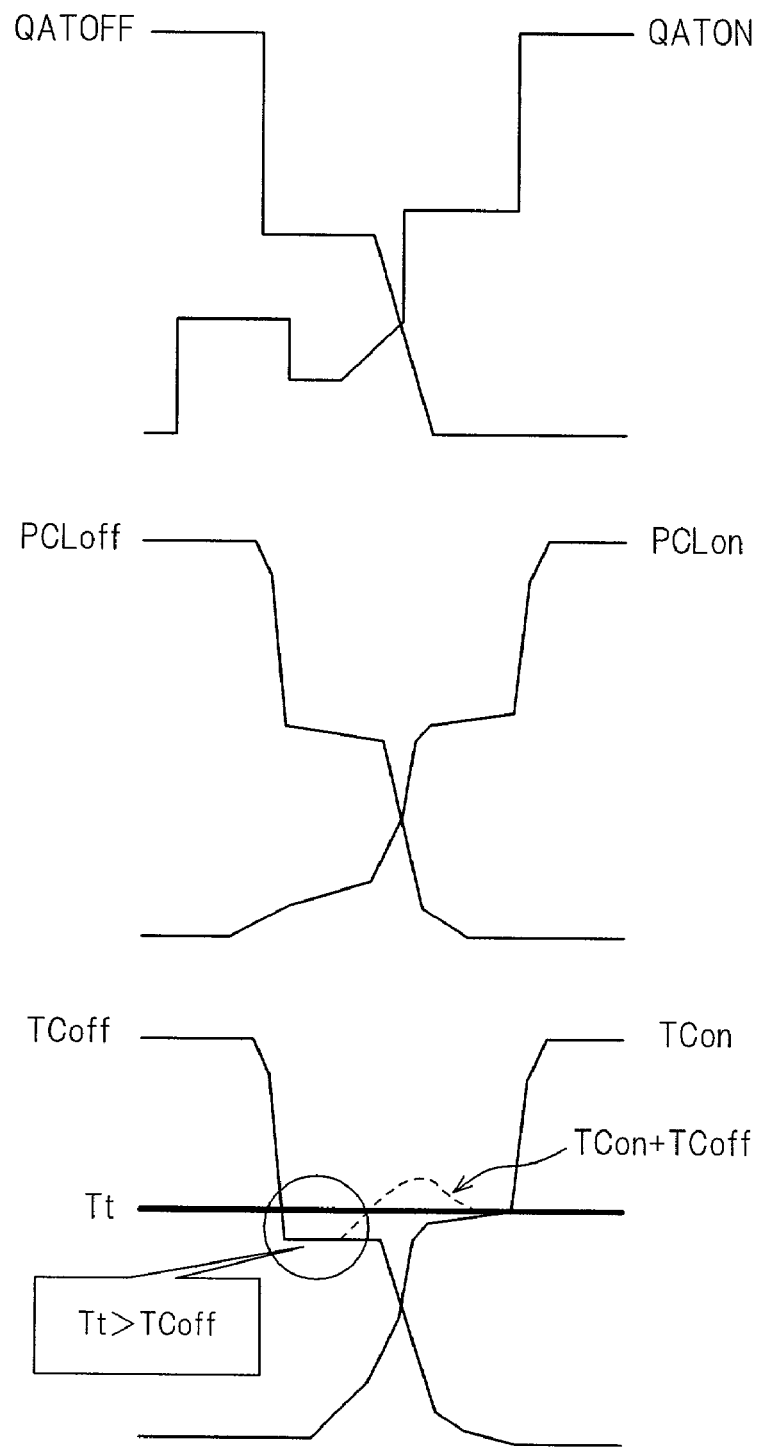
FIG. 32 is a time chart showing the processing of the flow chart of FIG. 31.
Figure 33:
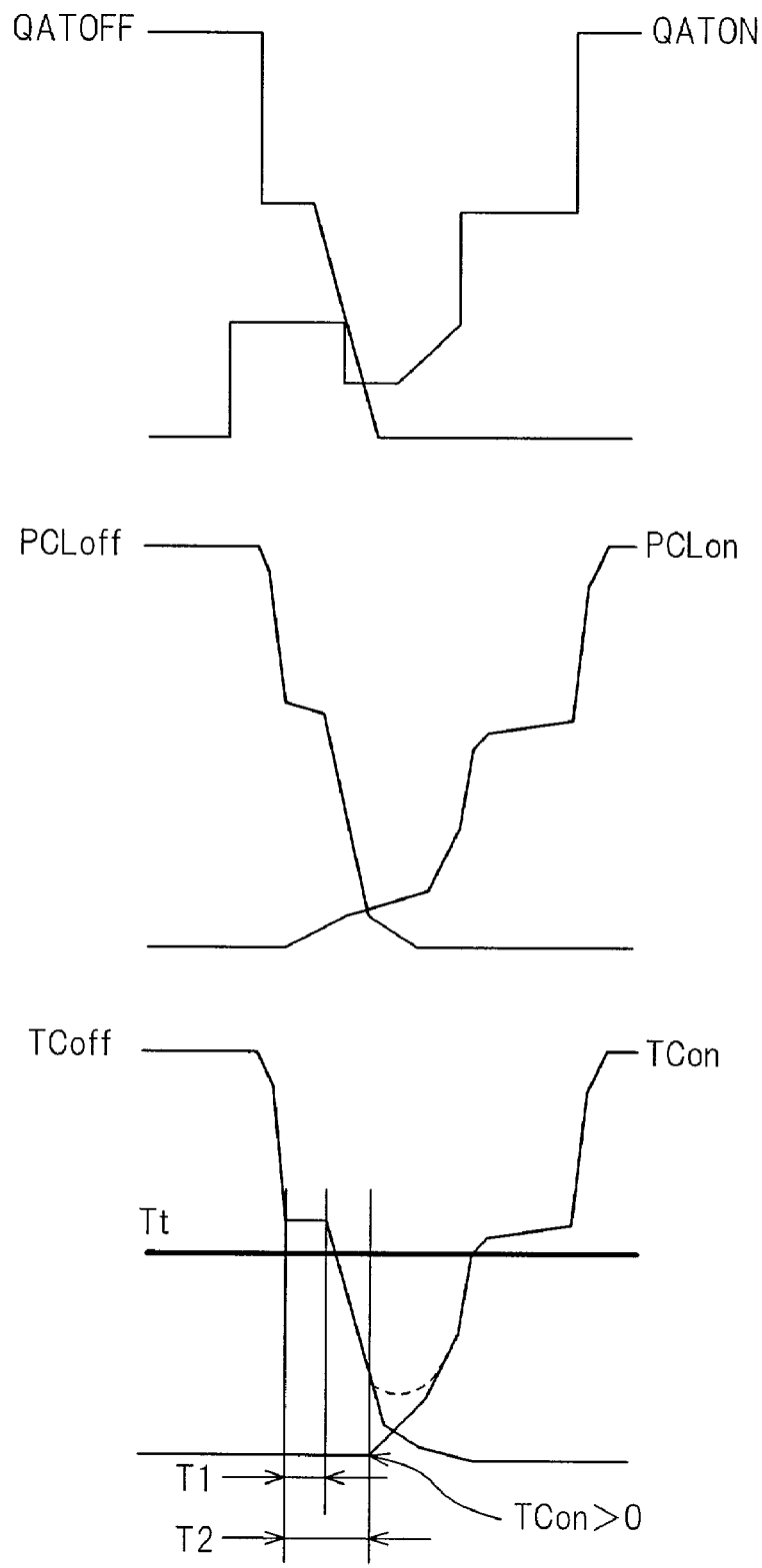
FIG. 33 is a time chart similarly showing the processing of the flow chart of FIG. 31.

The program begins in S200 in which it is determined whether the OFF-side clutch flat pressure (illustrated by encircled 5 in FIG. 5) is low. Specifically, this is done, as illustrated in FIG. 32, by determining whether the OFF-side clutch torque TCoff (obtained by the simulation) is less than a transmission input torque Tt.

When the result is affirmative, the program proceeds to S202 in which the OFF-side clutch flat pressure is increased to the transmission input torque Tt, to S204 in which the durability simulation is again conducted, to S206 in which it is determined whether excessive increase amount of engine speed is less than 50 rpm. When the result is affirmative, since this indicates the troublesome shift phenomenon is removed, the program is immediately terminated.

When the result in S206 is negative, the program loops back to S200 and if the result is negative, the program proceeds to S208 in which it is determined whether a period of time during which the OFF-side flat pressure keeping time (illustrated by encircled 4 in FIG. 5) T1 is less than a predetermined value T2. When the result is affirmative, the program proceeds to S210 in which the time T1 is extended to T2, for example, and to S204 in which the durability simulation is again conducted and to S206 to conduct the determination. When the result in S206 is affirmative, the program is immediately terminated.

When the result in S206 is negative, the program loops back to S200 and if the result is negative, the program proceeds to S208 to conduct the determination. When the result is negative, the program proceeds to S212 in which it is determined whether the ON-side preparatory pressure (illustrated by encircled 3 in FIG. 4) obtained through the simulation is low. Specifically, this is done, as illustrated in FIG. 34, by determining whether the sum of the ON-side clutch torque TCon and the OFF-side clutch torque TCoff (obtained through the simulation) is greater than the transmission input torque Tt. This is because the excessive engine speed increase occurs when the sum of the clutch torque at the ON-side and the OFF-side is less than the transmission input torque Tt.

When the result is affirmative, the program proceeds to S214 in which the ON-side clutch preparatory pressure is increased, to S204 in which the durability simulation is again conducted, to S206 to conduct the determination. When the result is affirmative, the program is immediately terminated.

On the other hand, when the result in S206 is negative, the program loops back to S200 and when the results in S200, S208 and S212 are negative, the program proceeds to S216 in which it is determined whether the ON-side clutch preparatory pressure keeping time (illustrated by encircled 4 in FIG. 4) T3 is less than a predetermined value T4, as illustrated in FIG. 35. When the result is affirmative, the program proceeds to S218 in which the time T3 is extended to T4, for example, and to S204 in which the durability simulation is again conducted and to S206 to conduct the determination. When the result in S206 is affirmative, the program is immediately terminated. On the other hand, when the result in S206 is negative, the program again loops back to S200 and repeats the procedures mentioned above.

Thus, it becomes possible to restrict the amount of correction of the shift control algorithm to a necessary and least limit by changing a part of the data constituting the shift control algorithm. With this, in the example shown in FIG. 30, the excessive engine speed increase (illustrated in FIG. 30) can be completely removed and solved.

Figure 36:
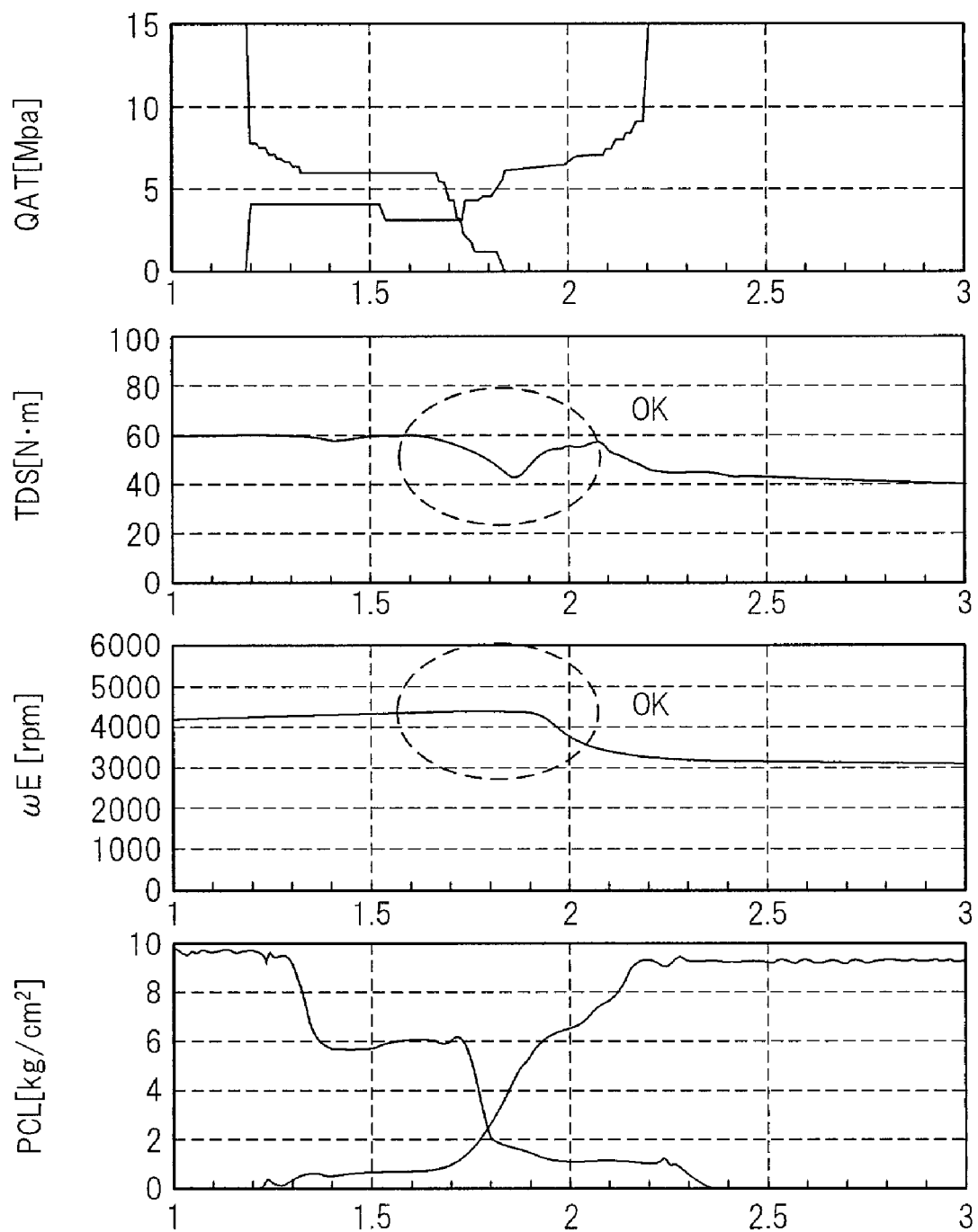
FIG. 36 is a set of graphs showing a situation where the occurrence of undesirable and troublesome shift phenomenon was removed by the processing referred to in the flow chart of FIG. 23.

FIG. 37 is a graph, obtained by overlapping the graphs in FIGS. 30 and 36, showing the situation where the occurrence of undesirable and troublesome shift phenomenon was forecast through the durability simulation, but was removed by repeating the simulation, while correcting the shift control algorithm stored in the ECU 32.

It should be noted that the actual durability test is then conducted by placing the transmission T on a test bench and by connecting it to the engine E, as illustrated in FIG. 27 to determine product quality of the transmission T and the shift control algorithm. In fact, the inventors have found that desired quality of product was revealed in the actual bench test and hence, the preliminary test (and manufacturing of a test transmission) was no longer needed.

It should also be noted in the above that although the three kinds of parameters including the ATF temperature TATF, the clutch clearance CL and the clutch friction coefficient μ are all used, it is alternatively possible to use only one or two of the three. It should further be noted that these three parameters are examples and other similar parameter(s) may instead be used.

As mentioned in the above, a simulator for automatic vehicle transmission controllers according to the second embodiment is configured such that the durability of the transmission T is tested through simulation using the ECU 32 only. With this, it becomes no longer necessary to build a transmission for testing or to conduct the preliminary test. Further, it becomes possible to shorten the period of test to be conducted before the bench test from 20 days to 5.5 days, thereby enabling to enhance the efficiency of development of the automatic vehicle transmissions and to decrease the cost for evaluating the quality of product. Furthermore, with this, it becomes possible to improve the reliability to the durability of the product. Furthermore, since the simulation is conducted in a time close to that of actual gear shifting, the efficiency of development is further enhanced.

Further, since the calculation result of the model behavior changes is stored as a data base, it becomes possible to decrease the volume of calculation and the simulation time, when similar durability simulation is conducted on different transmissions.

The first and second embodiments are thus configured to have a simulator having computer-aided design programs for simulating a shift control algorithm stored in a shift controller (32) of an automatic transmission (T) mounted on a vehicle (12) and having a hydraulic actuator (20) to transmit power generated by an internal combustion engine (E) to drive wheels (14) based on at least throttle opening (THHF) and vehicle speed (V) in accordance with the shift control algorithm. The characteristic features are that the simulator includes: a control system design tool (34a, S10, S12) which is connected to the shift controller to inputs the shift control algorithm and which outputs a hydraulic pressure supply command (QAT) based on the inputted shift control algorithm; a first simulator section (36a, S14) which is connected to the control system design tool to inputs the hydraulic pressure supply command (QAT) and which estimates an effective clutch pressure (PCL) that is assumably generated in the hydraulic actuator (20) in response to the hydraulic pressure supply command based on a first model (shift simulation model) describing entire system including the transmission (T); and a second simulator section (40a, S18-S20) which is connected to the control system design tool and the first simulator section and which determines transfer functions (α1, α2) of a second model (simplified hydraulic model) describing behavior of the hydraulic actuator (20) such that an output of the second model converges the estimated effective hydraulic pressure; wherein the second simulator section simulates an evaluates the shift control algorithm based on a third model (real-time shift simulation model) obtained by incorporating the second model with the first model.

The simulator further includes: a host computer (44) which designs the second model and stores data such that the second simulator section determines the transfer functions by retrieving the stored data by predetermined parameter.

In the simulator, the transfer functions includes a first transfer function (α1) which is corresponding to a predetermined period of time at which the output of the second model begins increasing.

In the simulator, the second model includes a function (Z3) which generates the output (y) when a time during which an input (x) of the second model exceeds a predetermined value (IREF), is greater than the predetermined period of time.

In the simulator, the transfer function includes a second transfer function (α2) which is multiplied to an input (x) of the second model such that the output (y) of the second model converges the estimated effective hydraulic pressure.

In the simulator, the parameter is at least one of a fluid temperature of the transmission (TATF), a rotational speed of the hydraulic actuators (NCL), the hydraulic supply command (QAT) and a shift interval.

In the simulator, the second simulator section further includes; parameter extracting means (S24) for extracting a parameter having influence on durability of the transmission (T); undesirable shift phenomenon forecasting means (S26, S28) for conducting simulation based on the third model, while changing the parameter and forecasting occurrence of undesirable phenomenon based on behavior change of the third model; and algorithm correcting means (S30, S200-S218) for correcting the shift control algorithm based on a result of forecasting.

In the simulator, the algorithm correcting means corrects the shift control algorithm by repeating the simulation until the forecast occurrence of undesirable phenomenon disappears.

In the simulator, the second simulator section further includes; transmission characteristic analyzing means (S22) for analyzing the characteristics of the transmission when shift is conducted in accordance with the shift control algorithm; and the algorithm correcting means corrects the shift control algorithm based on the analyzed characteristic of the transmission.

The simulator further includes: data base which stores the behavior change of the third model when the parameter is changed.

In the simulator, the algorithm correcting means corrects a least part of the shift control algorithm based on a result of the forecast, and the parameter is at least one of a fluid temperature of the transmission (TATF), a clearance of the hydraulic actuator (CL), and a friction coefficient of the hydraulic actuator (μ).

The entire disclosure of Japanese Patent Application Nos. 2000-244,412 and 2000-244,413 both filed on Aug. 11, 2000, including specification, claims, drawings and summary, is incorporated herein in reference in its entirety.

While the invention has thus been shown and described with reference to specific embodiments, it should be noted that the invention is in no way limited to the details of the described arrangements but changes and modifications may be made without departing from the scope of the appended claims.

What is claimed is:

1. A simulator system having computer-aided design programs for simulating a shift control algorithm for an automatic transmission of a vehicle having a hydraulic actuator to transmit power generated by an internal combustion engine to drive wheels in accordance with the shift control algorithm, comprising:
   a control system design tool for inputting the shift control algorithm and for outputting a hydraulic pressure supply command as a pseudo signal such that the hydraulic pressure supply command is supplied to the hydraulic actuator through a hydraulic circuit based on a shift signal from the shift control algorithm;
   a first simulator section connected to the control system design tool for inputting the hydraulic pressure supply command and for estimating an effective hydraulic pressure generated in the hydraulic actuator in response to the hydraulic pressure supply command based on a first model;
   a second simulator section connected to the control system design tool and to the first simulator section for determining transfer functions of a second model describing behavior of the hydraulic actuator such that an output of the second model converges with the estimated effective hydraulic pressure; and
   a third model obtained by incorporating the second model with the first model, wherein the second simulator section simulates and evaluates the shift control algorithm based on the third model.

2. The simulator system according to claim 1, further including:
   a host computer for designing the second model and for storing data such that the second simulator section determines the transfer functions by retrieving the stored data by a predetermined parameter.

3. The simulator system according to claim 1, wherein the transfer functions include at least one transfer function that corresponds to a predetermined period of time at which the output of the second model begins to increase.

4. The simulator system according to claim 3, wherein the second model generates the output when an input of the second model exceeding a predetermined value is greater than the predetermined period of time.

5. The simulator system according to claim 1, wherein the transfer functions include at least one transfer function which is multiplied to an input of the second model such that the output of the second model converges with the estimated effective hydraulic pressure.

6. The simulator system according to claim 2, wherein the predetermined parameter is at least one of a fluid temperature of the transmission, a rotational speed of the hydraulic actuator, the hydraulic supply command and a shift interval.

7. A simulator system having computer-aided design programs for simulating a shift control algorithm for an automatic transmission of a vehicle having a hydraulic actuator to transmit power generated by an internal combustion engine to drive wheels in accordance with the shift control algorithm, comprising:

transmission characteristic analyzing means for analyzing characteristics of the transmission when a shift is assumedly conducted in accordance with the shift control algorithm through a value to determine deviation of the characteristics from a predetermined standard;
parameter extracting means for extracting a parameter having influence on the characteristics when durability of the transmission is degraded;
undesirable shift phenomenon forecasting means for conducting simulation based on a model, while changing the parameter and forecasting occurrence of undesirable phenomenon using the value based on behavior change of the model; and
algorithm correcting means for correcting the shift control algorithm based on a result of forecasting such that the forecasted occurrence of undesirable phenomenon disappears.

8. The simulator system according to claim 7, wherein the algorithm correcting means corrects the shift control algorithm by repeating the simulation until the forecast occurrence of undesirable phenomenon disappears.

9. The simulator system according to claim 7, further including:
   a data base for storing the behavior change of the model when the parameter is changed.

10. The simulator system according claim 7, wherein the algorithm correcting means corrects at least part of the shift control algorithm based on a result of the forecast.

11. The simulator system according to claim 7, wherein the parameter is at least one of a fluid temperature of the transmission, a clearance of the hydraulic actuator, and a friction coefficient of the hydraulic actuator.

12. A simulator system having computer-aided design programs for simulating a shift control algorithm for an automatic transmission of a vehicle having a hydraulic actuator to transmit power generated by an internal combustion engine to drive wheels in accordance with the shift control algorithm, comprising:
   a control system design tool for inputting the shift control algorithm and for outputting a hydraulic pressure supply command as a pseudo signal such that the hydraulic pressure supply command is supplied to the hydraulic actuator through a hydraulic circuit based on a shift signal from the shift control algorithm;
   a first simulator section connected to the control system design tool for inputting the hydraulic pressure supply command and for estimating an effective hydraulic pressure generated in the hydraulic actuator in response to the hydraulic pressure supply command based on a first model; and
   a second simulator section connected to the control system design tool and to the first simulator section for determining transfer functions of a second model describing behavior of the hydraulic actuator such that an output of the second model converges with the estimated effective hydraulic pressure, the second simulator section simulates and evaluates the shift control algorithm based on a third model obtained by incorporating the second model with the first model,
   wherein the second simulator section includes:
   transmission characteristic analyzing means for analyzing characteristics of the transmission when a shift is assumedly conducted in accordance with the shift control algorithm through a value to determine deviation of the characteristics from a predetermined standard;

parameter extracting means for extracting a parameter having influence on the characteristics when durability of the transmission is degraded;

undesirable shift phenomenon forecasting means for conducting simulation based on the third model, while changing the parameter and forecasting occurrence of undesirable phenomenon using the value based on behavior change of the third model; and algorithm correcting means for correcting the shift control algorithm such that the forecasted occurrence of undesirable phenomenon disappears.

13. The simulator system according to claim 12, wherein the algorithm correcting means corrects the shift control algorithm by repeating the simulation until the forecast occurrence of undesirable phenomenon disappears.

14. The simulator system according to claim 12, further including:

a data base for storing the behavior change of the third model when the parameter is changed.

15. The simulator system according to claim 12, wherein the algorithm correcting means corrects at least part of the shift control algorithm based on a result of the forecast.

16. The simulator system according to claim 12, wherein the parameter is at least one of a fluid temperature of the transmission, a clearance of the hydraulic actuator, and a friction coefficient of the hydraulic actuator.

17. A method for simulating a shift control algorithm for an automatic transmission of a vehicle having a hydraulic actuator to transmit power generated by an internal combustion engine to drive wheels in accordance with the shift control algorithm, said method comprising the steps of:

(a) inputting the shift control algorithm to output a hydraulic pressure supply command as a pseudo signal to be supplied to the hydraulic actuator through a hydraulic circuit based on a shift signal in the inputted shift control algorithm;

(b) inputting the hydraulic pressure supply command and estimating an effective hydraulic pressure generated in the hydraulic actuator in response to the hydraulic pressure supply command based on a first model (c) determining transfer functions of a second model such that an output of the second model converges with the estimated effective hydraulic pressure; and (d) simulating and evaluating the shift control algorithm based on a third model obtained by incorporating the second model with a hydraulic circuit of the first model.

18. The method according to claim 17, further including the step of:

(e) designing the second model and storing data such that the transfer functions are determined by retrieving the stored data by a predetermined parameter.

19. The method according to claim 18, wherein the parameter is at least one of a fluid temperature of the transmission, a rotational speed of the hydraulic actuator, the hydraulic supply command and a shift interval.

20. The method according to claim 17, wherein the transfer functions include a first transfer function corresponding to a predetermined period of time at which the output of the second model begins to increase.

21. The method according to claim 20, wherein the second model generates the output when an input of the second model exceeding a predetermined value is greater than the predetermined period of time.

22. The method according to claim 17, wherein the transfer functions include at least one transfer function which is multiplied to an input of the second model such that the output of the second model converges with the estimated effective hydraulic pressure.

23. A method for simulating a shift control algorithm for an automatic transmission of a vehicle having a hydraulic actuator to transmit power generated by an internal combustion engine to drive wheels in accordance with the shift control algorithm, said method comprising the steps of:

(a) analyzing characteristics of the transmission when it is assumed that a shift is conducted in accordance with the shift control algorithm through a value to determine deviation of the characteristics from a predetermined standard;

(b) extracting a parameter having influence on the characteristics when durability of the transmission is degraded;

(c) conducting simulation based on a model, while changing the parameter and forecasting occurrence of undesirable phenomenon using the value based on behavior change of the model; and (d) correcting the shift control algorithm based on a result of forecasting such that the forecasted occurrence of undesirable phenomenon disappears.

24. The method according to claim 23, wherein the step (d) corrects the shift control algorithm by repeating the simulation until the forecast occurrence of undesirable phenomenon disappears.

25. The method according to claim 23, further including the step of:

(e) storing the behavior change of the model when the parameter is changed.

26. The method according claim 23, wherein the step (d) corrects at least part of the shift control algorithm based on a result of the forecast.

27. The method according to claim 23, wherein the parameter is at least one of a fluid temperature of the transmission, a clearance of the hydraulic actuator, and a friction coefficient of the hydraulic actuator.

28. A method for simulating a shift control algorithm for an automatic transmission of a vehicle having a hydraulic actuator to transmit power generated by an internal combustion engine to drive wheels in accordance with the shift control algorithm, said method comprising the steps of:

(a) inputting the shift control algorithm to output a hydraulic pressure supply command as a pseudo signal to be supplied to the hydraulic actuator through a hydraulic circuit based on a shift signal in the inputted shift control algorithm;

(b) inputting the hydraulic pressure supply command and estimating an effective hydraulic pressure generated in the hydraulic actuator in response to the hydraulic pressure supply command based on a first model describing the entire system including the transmission; and (c) determining transfer functions of a second model describing behavior of the hydraulic actuator such that an output of the second model converges with the estimated effective hydraulic pressure, and simulating and evaluating the shift control algorithm based on a third model obtained by incorporating the second model with the hydraulic circuit of the first model, wherein the step (c) includes the steps of:

(d) analyzing characteristics of the transmission when it is assumed that a shift is conducted in accordance with the shift control algorithm through a value to determine deviation of the characteristics from a predetermined standard;

(e) extracting a parameter having influence on the characteristics when durability of the transmission is degraded;
(f) conducting simulation based on the third model, while changing the parameter and forecasting occurrence of undesirable phenomenon using the value based on behavior change of the third model; and
(g) correcting the shift control algorithm based on a result of forecasting.

29. The method according to claim 28, wherein the step (g) corrects the shift control algorithm by repeating the simulation until the forecast occurrence of undesirable phenomenon disappears.

30. The method according to claim 28, further including the step of:
(h) storing the behavior change of the third model when the parameter is changed.

31. The method according to claim 28, wherein the step (g) corrects at least part of the shift control algorithm based on a result of the forecast.

32. The method according to claim 28, wherein the parameter is at least one of a fluid temperature of the transmission, a clearance of the hydraulic actuator, and a friction coefficient of the hydraulic actuator.

33. A simulator system having computer-aided design programs for simulating a shift control algorithm for an automatic transmission of a vehicle having a hydraulic actuator to transmit power generated by an internal combustion engine to drive wheels in accordance with the shift control algorithm, comprising:
a test model hydraulic circuit design model conducting a test to obtain clutch pressure during an assumed shift of the automatic transmission in accordance with the shift control algorithm;
a shift simulation model analyzing a result of the test;
a simplified hydraulic model having transfer functions determined by the result of the test;
a real-time shift simulation model incorporating the simplified hydraulic model with the shift simulation model and determining characteristics inherent to the automatic transmission by evaluating the shift control algorithm through simulation, extracting parameters having influence on degradation of the automatic transmission, performing and repeating a durability simulation while changing parameters to forecast undesirable phenomenon during shifting, and correcting the shift control algorithm while repeating the durability simulation until the undesirable phenomenon disappear.

34. A method for simulating a shift control algorithm for an automatic transmission of a vehicle having a hydraulic actuator to transmit power generated by an internal combustion engine to drive wheels in accordance with the shift control algorithm, said method comprising the steps of:
designing a test model hydraulic circuit design model;
conducting a test using the test model hydraulic circuit design model to obtain a clutch pressure during an assumed shift of the automatic transmission in accordance with the shift control algorithm;
analyzing a result of the test using a shift simulation model;
designing a simplified hydraulic model based on the result of the test;
designing a real-time shift simulation model by incorporating the simplified hydraulic model with the shift simulation model;
conducting a simulation to evaluate the shift control algorithm using the real-time simulation model;
analyzing the shift control algorithm and determining characteristics inherent to the transmission using a result of the simulation;
extracting from the characteristics parameters having influence on degradation of the transmission;
preparing a durability simulation using the real-time shift simulation model;
repeating the durability simulation by changing the parameters to forecast undesirable phenomenon during shifting; and
correcting the shift control algorithm, while repeating the durability simulation, until the undesirable phenomenon disappear.

* * * * *